United States Patent
Sato et al.

(10) Patent No.: US 9,079,780 B2
(45) Date of Patent: Jul. 14, 2015

(54) ALKALI METAL SALT OF FLUOROSULFONYL IMIDE, AND PRODUCTION METHOD THEREFOR

(75) Inventors: Yuichi Sato, Suita (JP); Shimpei Sato, Suita (JP); Yasunori Okumura, Suita (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 0 days.

(21) Appl. No.: 13/700,364

(22) PCT Filed: May 27, 2011

(86) PCT No.: PCT/JP2011/062295
§ 371 (c)(1),
(2), (4) Date: Nov. 27, 2012

(87) PCT Pub. No.: WO2011/149095
PCT Pub. Date: Dec. 1, 2011

(65) Prior Publication Data
US 2013/0068991 A1    Mar. 21, 2013

(30) Foreign Application Priority Data

May 28, 2010 (JP) ................. 2010-123474
Jun. 15, 2010 (JP) ................. 2010-136382
Sep. 1, 2010 (JP) ................. 2010-196236

(51) Int. Cl.
| H01G 9/02 | (2006.01) |
| C01D 15/00 | (2006.01) |
| C01B 21/093 | (2006.01) |
| C01B 21/086 | (2006.01) |
| H01G 9/035 | (2006.01) |
| H01M 10/0568 | (2010.01) |
| H01M 10/052 | (2010.01) |
| B01D 1/22 | (2006.01) |
| B01D 3/34 | (2006.01) |

(52) U.S. Cl.
CPC .............. *C01D 15/00* (2013.01); *C01B 21/086* (2013.01); *C01B 21/0935* (2013.01); *H01G 9/035* (2013.01); *H01M 10/052* (2013.01); *H01M 10/0568* (2013.01); *B01D 1/22* (2013.01); *B01D 3/346* (2013.01); *Y02E 60/122* (2013.01)
USPC .......................................... 423/386; 252/62.2

(58) Field of Classification Search
USPC .......................................... 252/62.2; 423/386
See application file for complete search history.

(56) References Cited

U.S. PATENT DOCUMENTS

| 3,989,740 A * | 11/1976 | Broussard et al. ............ 260/486 |
| 5,652,072 A | 7/1997 | Lamanna et al. |
| 5,691,081 A | 11/1997 | Krause et al. |
| 5,723,664 A | 3/1998 | Sakaguchi et al. |
| 5,916,475 A | 6/1999 | Michot et al. |
| 6,254,797 B1 | 7/2001 | Michot et al. |
| 6,682,855 B2 | 1/2004 | Michot et al. |
| 7,253,317 B2 | 8/2007 | Cernik et al. |
| 7,834,197 B2 | 11/2010 | Nishida et al. |
| 2001/0025943 A1 | 10/2001 | Michot et al. |
| 2004/0097757 A1 | 5/2004 | Cernik et al. |
| 2007/0042271 A1 | 2/2007 | Nishida et al. |
| 2007/0043231 A1 | 2/2007 | Hammami et al. |
| 2011/0034716 A1 | 2/2011 | Okumura et al. |
| 2011/0123873 A1 | 5/2011 | Nishida et al. |
| 2013/0324337 A1 | 12/2013 | Yoshida et al. |

FOREIGN PATENT DOCUMENTS

| JP | 08-081436 | 3/1996 |
| JP | 08-511274 | 11/1996 |
| JP | 11-152563 | 6/1999 |
| JP | 11-512563 | 10/1999 |

(Continued)

OTHER PUBLICATIONS

Billet, R., Performance of thin-film distillation and its application, Sep. Technol., 2, 183-191 (1992).*
Matsuda, et al., Effect of Imide Salt Purity in Electrolytes on Charge-Discharge Performance of Negative Electrodes for Lithium Secondary Batteries, Proceedings of the 68th Annual Meeting of the Eelectrochemical Society of Japan, partial English Translation, p. 232, Mar. 25, 2001.*
Leal, J.P., et al. Bridging the Gap between Ionic Liquids and Molten Salts: Group 1 Metal Salts of the Bistriflamide Anion in the Gas Phase, J. Phys. Chem. B., 113, 3491-3498, 2009.*
Beran et al., "A New Method of the Preparation of Imido-bis(sulfuric acid) Dihalogenide, (F, Cl), and the Potassium Salt of Imido-bis-(sulfuric acid) Difluoride," Z. Anorg. Allg. Chem., 631, 55-59, 2005.*

(Continued)

*Primary Examiner* — Paul A Zucker
*Assistant Examiner* — Mark Luderer
(74) *Attorney, Agent, or Firm* — Wenderoth, Lind & Ponack, L.L.P.

(57) ABSTRACT

The present invention provides an alkali metal salt of fluorosulfonyl imide having favorable heat resistance and a reduced content of specific impurities and a water content, and provides a method for producing an alkali metal salt of fluorosulfonyl imide, which is capable of easily removing a solvent from a reaction solution. An alkali metal salt of fluorosulfonyl imide of the present invention is represented by the following general formula (I) and has a mass loss rate of 2% or less when the alkali metal salt of fluorosulfonyl imide is kept at 100° C. for 8 hours under an air current. A method for producing an alkali metal salt of fluorosulfonyl imide of the present invention comprises a step of concentrating a solution of the alkali metal salt of fluorosulfonyl imide by bubbling a gas into a reaction solution containing the alkali metal salt of fluorosulfonyl imide, and/or concentrating a solution of the alkali metal salt of fluorosulfonyl imide by thin layer distillation.

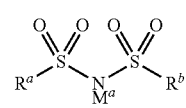

(I)

16 Claims, 1 Drawing Sheet

(56) References Cited

FOREIGN PATENT DOCUMENTS

| JP | 2001-139540 | 5/2001 | | |
|---|---|---|---|---|
| JP | 2004-522681 | 7/2004 | | |
| JP | 2009-504790 | 2/2009 | | |
| JP | 2009-129797 | 6/2009 | | |
| WO | 2005/003108 | 1/2005 | | |
| WO | 2009/072591 | 6/2009 | | |
| WO | 2009/123328 | 10/2009 | | |
| WO | WO2009/123328 | * 10/2009 | ............ | C01B 21/086 |
| WO | 2010/010613 | 1/2010 | | |

OTHER PUBLICATIONS

Kubota et al., "Thermal Properties of Alkali Bis(fluorosulfonyl)amides and Their Binary Mixtures," J. Chem. Eng. Data, 55, 3142-3146, 2010 (published May 25, 2010).*

International Search Report issued Sep. 6, 2011 in International (PCT) Application No. PCT/JP2011/062295.

Matsuda et al., "Effect of Imide Salt Purity in Electrolytes on Charge-Discharge Performance of Negative Electrodes for Lithium Secondary Batteries", Proceedings of the 68$^{th}$ Annual Meeting of the Electrochemical Society of Japan, Mar. 25, 2001, p. 232, with partial English translation.

Krumm et al., "Synthesis of Poly- and the First Perfluoroalkyl-$N(SO_2F)_2$ Derivatives: Improved Methods for the Preparation of $XN(SO_2F)_2$ (X=H, Cl) and Single-Crystal Diffraction Studies of $HN(SO_2Cl)_2$, $HN(SO_2F)_2$, and $CF_3CH_2N(SO_2F)_2$", Inorg. Chem., vol. 37 (24), pp. 6295-6303, 1998.

Ruff et al., "Imidodisulfuryl Fluoride, Cesium Imidodisulfuryl Fluoride, and Fluoroimidodisulfuryl Fluoride", Inorganic Synthesis, 11, pp. 138-140, 1968.

Search Report issued Oct. 9, 2013 in corresponding European Application No. 11786792.9.

Office Action issued Jun. 27, 2013 in corresponding Korean Application No. 10-2012-7034082, with English translation thereof.

Office Action issued Jun. 16, 2014 in corresponding European Application No. 11 786 792.9.

Office Action issued Apr. 24, 2014 in corresponding Chinese Application No. 201180026278.0, with English language translation thereof.

Office Action issued Dec. 22, 2014 in corresponding European Application No. 11 786 792.9.

* cited by examiner

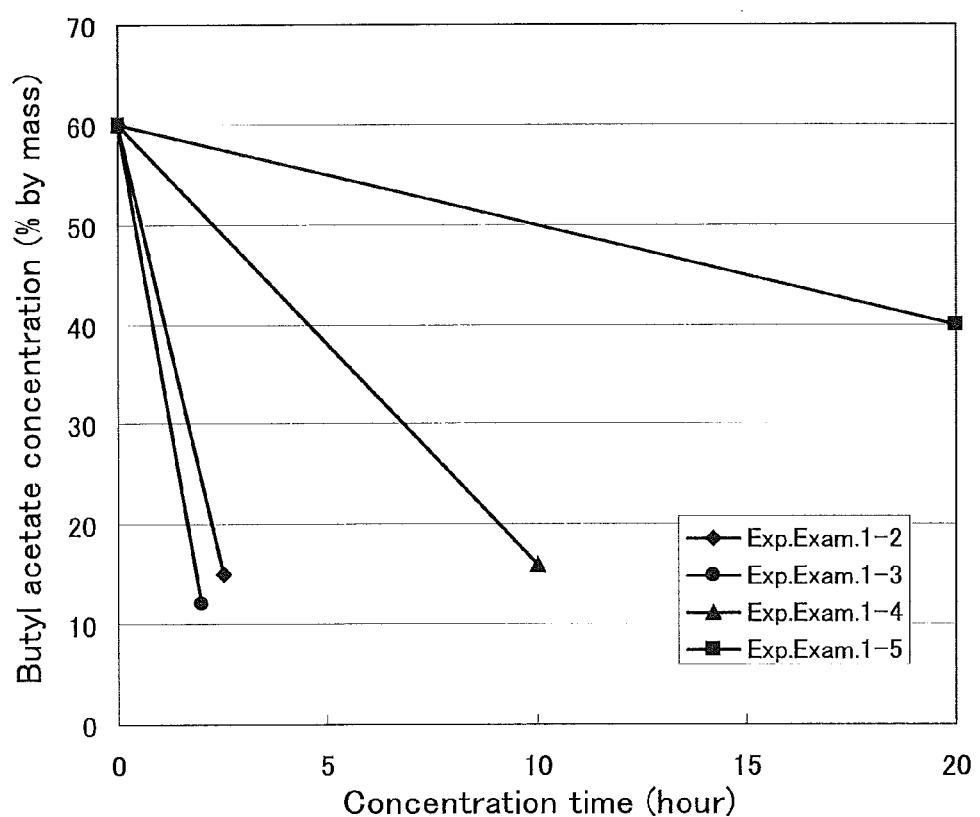

ALKALI METAL SALT OF FLUOROSULFONYL IMIDE, AND PRODUCTION METHOD THEREFOR

TECHNICAL FIELD

The present invention relates to an alkali metal salt of fluorosulfonyl imide, and more particularly to an alkali metal salt of N-(fluorosulfonyl)-N-(fluoroalkylsulfonyl)imide or bis(fluorosulfonyl)imide and a method for producing the same.

BACKGROUND ART

A fluorosulfonyl imide salt such as N-(fluorosulfonyl)-N-(fluoroalkylsulfonyl)imide salt, bis(fluorosulfonyl)imide salt and derivatives thereof are useful as intermediates for compounds having a $N(SO_2F)$ group or an $N(SO_2F)_2$ group, and are also useful compounds in various applications, for example, electrolytes, additives for electrolytic solutions of fuel cells, selective electrophilic fluorinating agents, photo acid generators, thermal acid generators, and near infrared light-absorbing dyes.

Fluorosulfonylimides have conventionally been prepared by a halogen exchange reaction of chlorosulfonylimide using a fluorinating agent (Non-Patent Documents 1 and 2); by distilling fluorosulfonic acid ($HFSO_3$) in the presence of urea (Patent Document 1). Further, present inventors have provided method for producing Fluorosulfonylimides using a fluorinating agent containing a predetermined element (Patent Document 2).

PRIOR ART

Patent Document

Patent Document 1: Japanese Published Patent Publication No. H08-511274
Patent Document 2: PCT International Publication No. WO 2009/123328

Non-Patent Document

Non-patent Document 1: John K. Ruff and Max Lustig, Inorg Synth. 11, 138-140 (1968)
Non-patent Document 2: Jean'ne M. Shreeve et al., Inorg. Chem. 1998, 37(24), 6295-6303

SUMMARY OF THE INVENTION

Problem to be Solved by the Invention

As described above, as a result of continuous improvement in fluorination of chlorosulfonyl imide, it has become possible to improve its yield to some extent. While studying the production of a fluorosulfonyl imide salt in a practical operation level, the present inventors have recognized such a new problem that it is difficult to remove a reaction solvent from a reaction solution when the amount of the solvent becomes 150% by mass or less based on 100% by mass of a raw material in the case of removing the solvent after formation of the fluorosulfonyl imide salt. The present inventors have also found that it is difficult to reduce the water content in the product because of high affinity with water of fluorosulfonyl imide. The water causes not only deterioration of voltage endurance of an electrolytic solution in the case of using fluorosulfonyl imide in an electrochemical device, but also corrosion of members (electrodes, etc.) constituting the device. It is also conceivable that a solvent and water are removed from the product by heating. However, the fluorosulfonyl imide salt does not have excellent heat resistance, and heating at high temperature and heating for a long time decrease the yield of the product, resulting in increased production costs.

Under these circumstances, the present invention has been made and an object thereof is to provide a method for producing an alkali metal salt of fluorosulfonyl imide, which is capable of easily removing a solvent from a reaction solution even in the case of increasing the production scale, and an alkali metal salt of fluorosulfonyl imide obtained by the method. Another object of the present invention is to provide an alkali metal salt of fluorosulfonyl imide having satisfactory heat resistance and an alkali metal salt of fluorosulfonyl imide having a reduced content of specific impurities and a water content, and an electrolytic solution containing the same.

Solutions to the Problems

The present inventors have intensively studied and found that the above problems are solved by the following method, and that an alkali metal salt of fluorosulfonyl imide obtained by the method of the present invention has excellent heat resistance, and an alkali metal salt of fluorosulfonyl imide having a reduced content of specific impurities and a water content has excellent heat resistance, and thus the present invention has been completed.

That is, the feature of the alkali metal salt of fluorosulfonyl imide of the present invention lies in that the alkali metal salt of fluorosulfonyl imide is represented by the following general formula (I), and has a mass loss rate of 2% or less when the salt is kept at 100° C. for 8 hours under an air current.

[Chemical Formula 1]

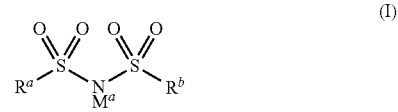

In the formula (I), $M^a$ represents an alkali metal, and $R^a$ and $R^b$ are the same or different and represent a fluorine atom, or a hydrocarbon group having 1 to 6 carbon atoms in which one or more hydrogen atoms are substituted with a fluorine atom.

As described above, the alkali metal salt of fluorosulfonyl imide of the present invention is less likely to be decomposed even when exposed to a heating atmosphere for a long period, and is excellent in heat resistance.

In the above alkali metal salt of fluorosulfonyl imide, the temperature is preferably 210° C. or higher at which a mass loss rate becomes 2% when the salt is heated from 25° C. at a temperature rise rate of 10° C./minute under an air current.

Also, the feature of the alkali metal salt of fluorosulfonyl imide of the present invention lies in that a content of sulfate ions ($SO_4^{2-}$) is 3,000 ppm or less. A content of fluoride ions ($F^-$) contained in the alkali metal salt of fluorosulfonyl imide of the present invention is preferably 1,000 ppm or less, and a water content is preferably 500 ppm or less. Furthermore, the alkali metal salt of fluorosulfonyl imide of the present invention preferably comprises 4,000 ppm or less of a residual solvent.

The present invention also encompasses an electrolytic solution which comprises an alkali metal salt of fluorosulfonyl imide represented by the above general formula (I) and a medium, and wherein a content of $SO_4^{2-}$ in the electrolytic solution is 1,500 ppm or less. The electrolytic solution of the present invention preferably has a water content of 250 ppm or less. Also, the electrolytic solution of the present invention preferably comprises 2,000 ppm or less of a residual solvent. Furthermore, the electrolytic solution of the present invention preferably has a content of $F^-$ of 500 ppm or less.

The production method of the present invention, which could achieve the above object, is a method for producing an alkali metal salt of fluorosulfonyl imide represented by the above general formula (I), and the feature thereof lies in that it comprises the steps of:

(1) concentrating a solution of an alkali metal salt of fluorosulfonyl imide while bubbling a gas into a reaction solution containing the alkali metal salt of fluorosulfonyl imide, and/or, (2) concentrating the reaction solution containing the alkali metal salt of fluorosulfonyl imide by thin film distillation.

The present inventors have intensively studied regarding the above-mentioned problems, and found that the reason that makes it difficult to remove the reaction solvent lies in an increase of the boiling point due to formation of an alkali metal salt of fluorosulfonyl imide, and in solvation between the alkali metal salt of fluorosulfonyl imide and a solvent molecule. Accordingly, they have studied to use a solvent which is difficult to form a solvate with the product as the reaction solvent. However, since solvents usable in the fluorination step of chlorosulfonyl imide are limited, it is not practical to change the reaction solvent. It is also conceivable that the reaction solvent is changed in any step after the fluorination step or before the cation exchange step. However, an increase in an amount of the solvent used is not preferred economically and environmentally. Accordingly, the present inventors have further studied about a method for efficiently removing the solvent from the reaction solution, and found that the reaction solvent can be removed easily by employing (1) a bubbling method, and/or (2) a thin film distillation method, in the concentration step, and that the alkali metal salt of fluorosulfonyl imide can be purified efficiently. That is, when a gas is bubbled into the reaction solution of the above (1), evaporation area is increased, and therefore, evaporation of the reaction solvent can be accelerated. Accordingly, the solvent can be removed rapidly without heating the reaction solution to high temperature. On the other hand, in the thin film distillation method of the above (2), the reaction solution to be subjected to heat transfer is formed into a thin film state on a heat transfer surface, whereby a large heat transfer coefficient can be obtained. As a result, the solvent can be removed rapidly without heating the heat transfer surface to high temperature. In the thin film distillation method, the solvent can be removed efficiently even in a device having a small heat transfer area. Thus, according to the method of the present invention, there is no need to heat the reaction solution in the production step to high temperature for a long period, and thus decomposition of the alkali metal salt of fluorosulfonyl imide by heating is suppressed. As a result, a reduction in heat resistance of the alkali metal salt of fluorosulfonyl imide attributable to decomposition products is suppressed.

The above concentration step is preferably performed at 150° C. or lower. The above concentration step is desirably performed at 40 kPa or less. The reaction solvents contained in the above reaction solution are preferably ester solvents and/or nitrile solvents. Furthermore, the aspect which includes, in addition to the above-mentioned steps, the step of drying by heating a concentrated liquid obtained in the concentration step to 100° C. or lower is a recommended embodiment of the present invention.

Desirably, the above production method further includes the step of fluorinating chlorosulfonyl imide or a salt thereof in the presence of the reaction solvent.

The term "fluorosulfonyl imide" in the present invention includes, in addition to bis(fluorosulfonyl)imide having two fluorosulfonyl groups, N-(fluorosulfonyl)-N-(fluoroalkylsulfonyl)imide having a fluorosulfonyl group and a fluorinated alkyl group. The term "chlorosulfonylimide", which is a starting material, is the same. The term "fluoroalkyl" means an alkyl group having 1 to 6 carbon atoms in which one or more hydrogen atoms are substituted with fluorine atoms, for example, the fluoroalkyl group includes a fluoromethyl group, a difluoromethyl group, a trifluoromethyl group, a fluoroethyl group, a difluoroethyl group, a trifluoroethyl group and a pentafluoroethyl group.

Advantages of the Invention

According to the present invention, a solvent can be removed rapidly from a reaction solution, and an alkali metal salt of fluorosulfonyl imide can be produced efficiently. The alkali metal salt of fluorosulfonyl imide of the present invention is excellent in heat resistance.

BRIEF DESCRIPTION OF THE DRAWING

FIG. 1 is a graph showing the results of Experimental Examples 1-2 to 1-5.

MODE FOR CARRYING OUT THE INVENTION

<Alkali Metal Salt of Fluorosulfonyl Imide>

The feature of the alkali metal salt of fluorosulfonyl imide of the present invention lies in that the alkali metal salt of fluorosulfonyl imide is represented by the following general formula (I), and has a mass loss rate of 2% or less when the salt is kept at 100° C. for 8 hours under an air current.

[Chemical Formula 2]

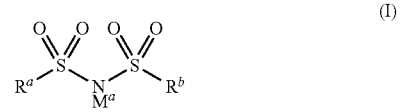

In the formula (I), $M^a$ represents an alkali metal, and $R^a$ and $R^b$ are the same or different and represent a fluorine atom, or a hydrocarbon group having 1 to 6 carbon atoms in which one or more hydrogen atoms are substituted with a fluorine atom.

As described above, the alkali metal salt of fluorosulfonyl imide of the present invention is less likely to be decomposed even when exposed to a heating atmosphere for a long period, and therefore, various electrochemical devices which use the salt as a material for an ionic conductor can demonstrate stable electrochemical properties for a long period. The various electrochemical devices can be used in a wide temperature range. As described below, the excellent heat resistance is attributable to a reduction in an amount of impurities contained in the alkali metal salt of fluorosulfonyl imide of the present invention.

As the mass loss is lower, the heat resistance is higher and preferable. The mass loss is preferably 1% or less.

Also, in the alkali metal salt of fluorosulfonyl imide of the present invention, the temperature is preferably 210° C. or higher at which the mass loss rate becomes 2% (hereinafter may be sometimes referred to as "2% mass loss rate temperature") when the salt is heated from 25° C. at a temperature rise rate of 10° C./minute under an air current. As used herein, the 2% mass loss rate temperature means a temperature at which a mass loss rate relative to an initial mass becomes 2% when a thermogravimetric analysis is performed under the above conditions. That is, a higher 2% mass loss rate temperature shows that an alkali metal salt of fluorosulfonyl imide is less likely to be decomposed and is stable even when exposed to high temperature. More preferably, the 2% mass loss rate temperature is 215° C. or higher.

Further, in the alkali metal salt of fluorosulfonyl imide of the present invention, the temperature is preferably 175° C. or higher at which the mass loss rate becomes 1% (hereinafter may be sometimes referred to as "1% mass loss rate temperature") when measured under conditions similar to those for the above 2% mass loss rate temperature. More preferably, the 1% mass loss rate temperature is 185° C. or higher.

Devices which can be used for the measurements of the above mass loss rate, 2% and 1% mass loss rate temperatures include a thermogravimetric/differential thermal analyzer (for example, "EXSTAR TG/DTA6200" manufactured by SII NanoTechnology Inc.) and the like. When a measuring sample contains water and a solvent, it is difficult to obtain accurate measurement results. Accordingly, it is preferred to use an alkali metal salt of fluorosulfonyl imide having a water content of 1,000 ppm or less in the present measurement. The water content is more preferably 500 ppm or less, and still more preferably 200 ppm or less. This is because influences on the measurement results are negligible levels when the water content is within the above range. Also, in the case where the above measurements (mass loss rate, 2% and 1% mass loss rate temperatures) are not performed immediately after the production of the alkali metal salt of fluorosulfonyl imide, it is recommended that the salt is subjected to the above measurements after adjusting the water content and the solvent contained in the measuring sample by keeping the sample at a temperature of 50° C. for 6 hours under vacuum.

Moreover, in the alkali metal salt of fluorosulfonyl imide of the present invention, the content of impurities is reduced to extremely low levels. Examples of the above impurities include decomposition products produced by heating in the below-mentioned concentration step and drying step as well as impurities immixed in the purification stage, and specifically include fluoride ions ($F^-$) and sulfate ions ($SO_4^{2-}$) corresponding to the decomposition products of the alkali metal salt of fluorosulfonyl imide, and also a solvent (hereinafter, referred to as a "residual solvent") and water used in the production stage and the purification stage of fluorosulfonyl imide, and the like. Specifically, the content of the sulfate ions ($SO_4^{2-}$) contained in the alkali metal salt of fluorosulfonyl imide (solid) of the present invention is preferably 3,000 ppm or less, and the content of the fluoride ions ($F^-$) is preferably 1,000 ppm or less (all the contents are on a mass basis; the same shall apply hereinafter).

An increase in an amount of impurities such as the above fluoride ions and sulfate ions means decomposition of fluorosulfonyl imide and reduction of purity. Accordingly, when the content of impurities is large, it is difficult to obtain desired properties when fluorosulfonyl imide is used in various applications. These impurities have an adverse effect of accelerating decomposition of fluorosulfonyl imide. Accordingly, it is difficult to keep initial properties when the content of impurities is large. Furthermore, the fluoride ions may corrode peripheral members of various devices which use the alkali metal salt of fluorosulfonyl imide. Accordingly, the content of these impurities is preferably as small as possible. For example, the content of the sulfate ions is preferably 1,000 ppm or less, more preferably 500 ppm or less, and still more preferably 300 ppm or less, in the alkali metal salt of fluorosulfonyl imide. On the other hand, the content of the fluoride ions is more preferably 800 ppm or less, further more preferably 500 ppm or less, and still more preferably 300 ppm or less, in the alkali metal salt of fluorosulfonyl imide. Most preferably, the above impurities are not contained in the alkali metal salt of fluorosulfonyl imide of the present invention. For example, the lower limit of each impurity may be about 1 ppm. As long as the content of impurities is within the above range, a problem originating from impure ion components is less likely to arise even when the alkali metal salt of fluorosulfonyl imide of the present invention is used as a material for an ionic conductor employed in the below-mentioned various electrochemical devices.

Also, the water content in the alkali metal salt of fluorosulfonyl imide (solid) of the present invention is preferably 300 ppm or less. As described above, water contained in the solid alkali metal salt of fluorosulfonyl imide is for a cause of corrosion of not only fluorosulfonyl imide but also constituent members in devices which use an alkali metal salt of fluorosulfonyl imide. Accordingly, the water content is more preferably 200 ppm or less, and still more preferably 100 ppm or less. The water content is preferably as small as possible, and preferably substantially 0 ppm. However, a reduction in an amount of water to 0 ppm may be difficult technically, and may not be preferred economically. Accordingly, the lower limit of the water content may be about 1 ppm.

Additionally, in the alkali metal salt of fluorosulfonyl imide (solid) of the present invention, the content of a residual solvent used in the production stage of the alkali metal salt of fluorosulfonyl imide is preferably 4,000 ppm or less. The residual solvent contained in the solid alkali metal salt of fluorosulfonyl imide is a cause of a reduction in heat resistance and a reduction in electrochemical performances. Accordingly, the content of such a residual solvent is preferably as small as possible, and preferably substantially 0 ppm. For the reason similar to that in the case of the water content, the amount of the residual solvent is more preferably 3,000 ppm or less. The lower limit of the amount of the residual solvent may be about 1 ppm. The above residual solvent includes a solvent used in the below-mentioned production stage of fluorosulfonyl imide.

Furthermore, in the alkali metal salt of fluorosulfonyl imide of the present invention, the contents of other impurities such as chloride ions ($Cl^-$) and potassium ions ($K^+$) are preferably as small as possible, in addition to the above fluoride ions and sulfate ions. The content of the chloride ions is more preferably 200 ppm or less, and further more preferably 100 ppm or less. On the other hand, the content of the potassium ions is preferably 10,000 ppm or less, more preferably 8,000 ppm or less, further more preferably 4,000 ppm or less, still more preferably 1,000 ppm or less, still further preferably 500 ppm or less, particularly preferably 200 ppm or less, and most preferably 100 ppm or less. The total content of the other impurities is preferably 10,000 ppm or less, more preferably 1,000 ppm or less, and still more preferably 500 ppm or less. The lower limit of the total content of the other impurities may be about 1 ppm.

The kind and content of the above impurities can be analyzed by the below-mentioned ICP emission spectrometric analysis method, NMR measurement, ion chromatography or the like. The water content can be measured by a Karl Fischer moisture meter, and the content of the residual solvent can be measured by gas chromatography.

<Composition Comprising Alkali Metal Salt of Fluorosulfonyl Imide>

The present invention encompasses a composition comprising the above alkali metal salt of fluorosulfonyl imide. In the composition of the present invention, the content of the sulfate ions is preferably 3,000 ppm or less based on 100% by mass of the total content of the alkali metal salt of fluorosulfonyl imide as well as the sulfate ions, water, the residual solvent and the fluorine ions (hereinafter referred to as "composition of the present invention"). The content of the sulfate ions is more preferably 1,000 ppm or less, further more preferably 500 ppm or less, and still more preferably 300 ppm or less. Most preferably, the sulfate ions are not contained in the composition of the present invention, and the lower limit may be about 1 ppm, for example. This is because problems such as decomposition of an electrolytic solution and corrosion of a constituent members in an electrochemical device are less likely to arise even when the composition of the present invention is used in the electrolytic solution for the electrochemical device.

Also, the composition of the present invention preferably has a reduced content of impurities other than the sulfate ions. Water, the residual solvent and the fluorine ions, similarly to the sulfate ions, may be a cause of decomposition of the alkali metal salt of fluorosulfonyl imide according to the present invention, and a cause of deterioration of an electrochemical device and the like when the composition of the present invention is used as an electrolytic solution for the device. Accordingly, the contents are preferably as follows. That is, the amount of the fluorine ions is preferably 1,000 ppm or less, more preferably 800 ppm or less, further more preferably 500 ppm or less, and still more preferably 300 ppm or less in 100% by mass of the composition of the present invention. The water content is preferably 500 ppm or less, more preferably 300 ppm or less, further more preferably 200 ppm or less, and still more preferably 100 ppm or less in 100% by mass of the composition of the present invention. The content of the residual solvent is preferably 4,000 ppm or less, and more preferably 3,000 ppm or less in 100% by mass of the composition of the present invention. Most preferably, the water content, the contents of the residual solvent and the fluorine ions are 0 ppm in the composition of the present invention, respectively. For example, the lower limit of each component may be about 1 ppm. As long as the water content, the contents of the residual solvent and the fluorine ions are within the above range, a problem originating from impure ion components is less likely to arise even when the composition of the present invention is used in an electrolytic solution employed in the below-mentioned various electrochemical devices.

The composition of the present invention may contain chloride ions and potassium ions. However, the content of the chloride ions is preferably 200 ppm or less, and more preferably 100 ppm or less, in 100% by mass of the total of the composition of the present invention and the chloride ions and/or the potassium ions. On the other hand, the content of the potassium ions is preferably 10,000 ppm or less, more preferably 8000 ppm or less, further more preferably 4,000 ppm or less, still more preferably 1,000 ppm or less, still further preferably 500 ppm or less, particularly preferably 200 ppm or less, and most preferably 100 ppm or less, in 100% by mass of the total of the composition of the present invention and the chloride ions and/or the potassium ions. Also, the total content of these ions is preferably 10,000 ppm or less, more preferably 1,000 ppm or less, and still more preferably 500 ppm or less, in 100% by mass of the total of the composition of the present invention and the chloride ions and/or the potassium ions. The lower limit of the total content of these ions may be about 1 ppm.

The contents of the above components (contents of the sulfate ions, the fluorine ions, water and the residual solvent) in the composition of the present invention can be measured by an ICP emission spectrometric analysis method, ion chromatography, a Karl Fischer moisture meter, and gas chromatography.

The contents of the above various ions are values detected by the above measuring methods. Accordingly, it is considered that the above mentioned ions are present in the form of a salt with a counterion in the solid alkali metal salt of fluorosulfonyl imide or in the composition of the present invention.

The alkali metal salt of fluorosulfonyl imide of the present invention is represented by the above general formula (I). In the above general formula (I), $M^a$ represents an alkali metal. $M^a$ is preferably Li, Na or K, and more preferably Li. In the above general formula (I), $R^a$ and $R^b$ are the same or different and represent a fluorine atom, or a hydrocarbon group having 1 to 6 carbon atoms in which one or more hydrogen atoms are substituted with a fluorine atom. The above hydrocarbon group is preferably a linear fluoroalkyl group having 1 to 6 carbon atoms, and examples thereof include a fluoromethyl group, a difluoromethyl group, a trifluoromethyl group, a fluoroethyl group, a difluoroethyl group, a trifluoroethyl group, and a pentafluoroethyl group and the like. Among them, a fluorine atom, a trifluoromethyl group and a pentafluoroethyl group are preferred as $R^a$ and $R^b$.

The alkali metal salts of bis(fluorosulfonyl)imide and N-(fluorosulfonyl)-N-(fluoroalkylsulfonyl)imide of the present invention are suitable as a material for an ionic conductor in various electrochemical devices. Particularly, lithium fluorosulfonyl imide having lithium as a cation is useful as an electrolyte used in a lithium secondary battery, a capacitor and the like, an ionic liquid or an intermediate of a fluorosulfonyl compound or the like.

There is no particular limitation on the method for producing fluorosulfonyl imide having heat resistance of the present invention. From the viewpoint of an improvement in heat resistance by reduction of the content of impurities, however, the production by the below-described method is recommended.

<Method for Producing Alkali Metal Salt of Fluorosulfonyl Imide>

The feature of the method for producing an alkali metal salt of fluorosulfonyl imide of the present invention lies in that it comprises the steps of (1) concentrating a solution of an alkali metal salt of fluorosulfonyl imide while bubbling a gas into a reaction solution containing the alkali metal salt of fluorosulfonyl imide, and/or, (2) concentrating the solution of the alkali metal salt of fluorosulfonyl imide by thin film distillation. Thus, there is no particular limitation on the other steps as long as the method includes the above step(s) (1) and/or (2). In the present invention, there is no particular limitation on a method for synthesizing the alkali metal salt of fluorosulfonyl imide, and any of conventionally known methods can be employed. Examples of the method for synthesizing fluorosulfonyl imide include a method in which (fluorosulfonyl)imide is obtained by distillation of fluorosulfonic acid ($HFSO_3$) in the presence of urea as described in Patent Document 1; a method in which fluorosulfonyl imide is synthesized from chlorosulfonyl imide using a fluorinating agent, and the like. Examples of a method for obtaining the alkali metal salt of fluorosulfonyl imide include methods in which a cation of fluorosulfonyl imide obtained by the above method is cation-exchanged for an alkali metal cation. Among the above-mentioned methods, the method for synthesizing an alkali metal salt of fluorosulfonyl imide by synthesizing fluorosulfonyl imide from chlorosulfonyl imide using a fluorinating agent (fluorination step) and then performing a cation exchange reaction (cation exchange step) will be described.

First, the fluorination step is described.

[Fluorination Step]

In the fluorination step, a fluorination reaction is performed on chlorosulfonyl imide or a salt thereof. Commercially available chlorosulfonyl imide or chlorosulfonyl imide synthesized by a known method may be used as a starting material.

Examples of the method for synthesizing chlorosulfonyl imide include a method in which, after reacting cyanogen chloride with sulfuric anhydride, the product (chlorosulfonyl isocyanate) is reacted with chlorosulfonic acid; a method in which, after reacting amidesulfuric acid with thionyl chloride, the reaction product is further reacted with chlorosulfonic acid (the above are a method for synthesizing bis(chlorosulfonyl)imide); a method in which chlorosulfonyl isocyanate is reacted with fluorinated alkylsulfonic acid or fluorosulfonic acid (a method for synthesizing N-(chlorosulfonyl)-N-(fluoroalkylsulfonyl)imide or N-(chlorosulfonyl)-N-(fluorosulfonyl)imide); and the like.

Next, the fluorination reaction of chlorosulfonyl imide is performed. There is no particular limitation on timing of the fluorination reaction, and there may be any aspect of an aspect in which, first, the fluorination reaction of chlorosulfonyl imide (proton form) is performed; and an aspect in which, after performing the cation exchange reaction of chlorosulfonyl imide, the fluorination reaction of a chlorosulfonyl imide salt is performed.

Examples of a method for fluorinating a chlorosulfonyl imide (proton form) or a salt thereof (hereinafter referred to as chlorosulfonyl imides) include a method in which chlorosulfonyl imide is halogen-exchanged using the fluorinating agent ($AsF_3$, $SbF_3$) described in Non-Patent Documents 1 and 2; a method in which di(chlorosulfonyl)imide is fluorinated using an ionic fluoride of a monovalent cation as the fluorinating agent, such as KF or CsF; and a method in which chlorosulfonyl imides are reacted with an alkali metal fluoride or a fluoride containing at least one kind of an element selected from the group consisting of elements of Groups 11 to 15 and Periods 4 to 6 (preferably, $CuF_2$, $ZnF_2$, $SnF_2$, $PbF_2$, $BiF_3$, etc.). Among these methods, a method in which chlorosulfonyl imides are reacted with a fluoride containing at least one kind of an element selected from the group consisting of elements of Groups 11 to 15 and Periods 4 to 6 (preferably, $CuF_2$, $ZnF_2$, $SnF_2$, $PbF_2$, $BiF_3$, etc.), is preferred. Also, a method for fluorinating di(chlorosulfonyl imide) using an alkali metal fluoride such as KF, LiF or NaF as a fluorinating agent is preferred because the alkali metal salt of fluorosulfonyl imide can be obtained in a single step.

In the fluorination step, it is preferable to use a non-protonic solvent as a reaction solvent. Specific examples of the reaction solvent include carbonates solvent such as ethylene carbonate, propylene carbonate, butylene carbonate, dimethyl carbonate, ethylmethyl carbonate and diethyl carbonate; ethers solvent such as dimethoxymethane, 1,2-dimethoxyethane, tetrahydrofuran, 2-methyltetrahydrofuran, 1,3-dioxane and 4-methyl-1,3-dioxolane; esters solvent such as methyl formate, methyl acetate, ethyl acetate, isopropyl acetate, butyl acetate, methyl propionate, γ-butyrolactone and γ-valerolactone; amides solvent such as N,N-dimethylformamide; nitriles solvent such as acetonitrile, butyronitrile, isobutyronitrile, valeronitrile and benzonitrile; nitros solvent such as nitromethane and nitrobenzene; sulfur compounds solvent such as sulfolane, 3-methylsulfolane and dimethyl sulfoxide; N-methyloxazolidinone. These solvent may be used alone or in combination of 2 or more. In view of smooth proceeding of the fluorination reaction, it is recommended to use a polar solvent. Among the solvents exemplified above, esters solvent and/or nitriles solvent are preferred, specifically, butyronitrile, isobutyronitrile, valeronitrile, ethyl acetate, isopropyl acetate and butyl acetate are preferred. In view of operability upon purification, a solvent having a low boiling point and capable of forming a two-layered state with water is preferred.

The completion of the fluorination reaction can be confirmed, for example, by $^{19}$F-NMR or the like. That is, a peak appears at a chemical shift corresponding to fluorine by the progress of the reaction. Furthermore, the relative intensity (integrated value) of the peak increases. Accordingly, the completion of the fluorination reaction may be confirmed while tracing the state of the progress of the reaction by $^{19}$F-NMR. When the reaction time is too long, formation of by-products becomes remarkable, and therefore it is preferred to terminate the fluorination reaction at the time of point when the relative intensity of the peak of the objective product becomes maximum (for example, about 6 hours to 12 hours from the initiation of the reaction).

[Cation Exchange Step]

Next, cation exchange step will be explained. Chlorosulfonyl imides, a fluorosulfonyl imide or a salt thereof (hereinafter referred to as fluorosulfonyl imides) can be cation-exchanged by reacting with a salt containing a desired cation. The cation is preferably a cation of an alkali metal such as Li, Na, K, Rb or Cs, or the below-mentioned onium cation. The fluorosulfonyl imide salt containing an alkali metal may be used as an ionic conductive material of various electrochemical devices by melting it at high temperature or dissolving it in a proper organic solvent. Also, a fluorosulfonyl imide salt containing an onium cation becomes an room temperature molten salt which stably maintains the state of being molten at room temperature, and is suited for use as a material of an ionic conductor of an electrochemical device which withstands use over a long period, or a reaction solvent in organic synthesis or the like. Examples of more preferred fluorosulfonyl imide salts include fluorosulfonyl imide salts containing a lithium cation or an onium cation.

Examples of the salt containing an alkali metal include alkali metal salts, for example, hydroxides such as LiOH, NaOH, KOH, RbOH and CsOH; carbonates such as $Li_2CO_3$, $Na_2CO_3$, $K_2CO_3$, $Rb_2CO_3$ and $Cs_2CO_3$; hydrogen carbonates such as $LiHCO_3$, $NaHCO_3$, $KHCO_3$, $RbHCO_3$ and $CsHCO_3$; chlorides such as LiCl, NaCl, KCl, RbCl and CsCl; fluorides such as LiF, NaF, KF, RbF and CsF; alkoxide compounds such as $CH_3OLi$ and EtOLi; and alkyl lithium compounds such as EtLi, BuLi and t-BuLi (Et represents an ethyl group, and Bu represents a butyl group).

On the other hand, the onium cation is preferably an onium cation represented by the general formula (II): $L^+$-Rs (wherein L represents C, Si, N, P, S or O; R (s) are the same or different and represent a hydrogen atom, a fluorine atom, or an organic group and, when R is an organic group, these groups may be mutually bonded; s is 2, 3 or 4, and is a value determined by a valence of an element L; and a bond between L and R may be a single bond or a double bond).

The "organic group" represented by R means a group having at least one carbon atom. The "group having at least one carbon atom" only may have at least one carbon atom, or may have the other atoms such as a halogen atom and a hetero atom, or may have a substituent. Examples of specific substituent include an amino group, an imino group, an amide group, a group having an ether bond, a group having a thioether bond, an ester group, a hydroxyl group, an alkoxy group, a carboxyl group, a carbamoyl group, a cyano group, a disulfide group, a nitro group, a nitroso group, a sulfonyl group and the like.

Specifically, the onium cation represented by the general formula (II) is preferably an onium cation represented by the following general formula:

[Chemical Formula 3]

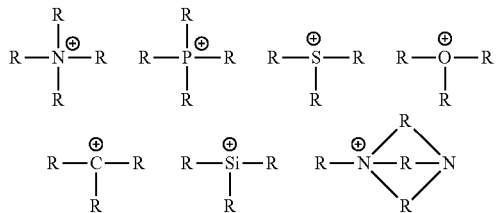

(wherein R denotes the same as in the general formula (II)). These onium cations may be employed alone, or two or more kinds of them may be employed in combination. Examples of preferred onium cation include a heterocyclic onium cation, an unsaturated onium cation, a saturated cyclic onium cation and a chain onium cation, which are described in PCT International Publication No. WO 2009/123328.

As a preferred onium cation, it is exemplified that a chain onium cation represented by the general formula (II); L$^+$-Rs wherein L is N, R is a hydrogen atom or a C$_1$ to C$_8$ alkyl group and s is 4; and 5 kinds of onium cations represented by the following general formulas:

[Chemical Formula 4]

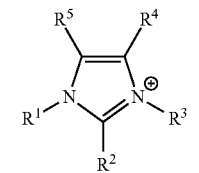 (1)

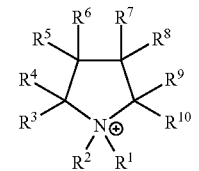 (2)

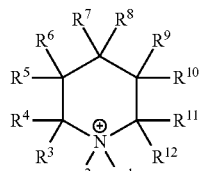 (3)

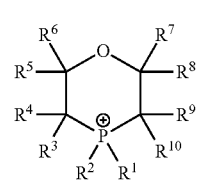 (4)

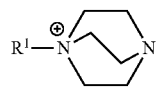 (5)

In the above mentioned general formula, R$^1$ to R$^{12}$ are the same or different and represent a hydrogen atom, a fluorine atom or an organic group, and when R is an organic group, these groups may be bonded to each other. The organic group is preferably a linear, branched or cyclic, saturated or unsaturated hydrocarbon group or a fluorocarbon group having 1 to 18 carbon atoms, and more preferably a saturated or unsaturated hydrocarbon group or a fluorocarbon group having 1 to 8 carbon atoms. These organic groups may contain a hydrogen atom, a fluorine atom, a nitrogen atom, an oxygen atom, a sulfur atom, or a functional group such as an amino group, an imino group, an amide group, an ether group, an ester group, a hydroxyl group, a carboxyl group, a carbamoyl group, a cyano group, a sulfone group or a sulfide group. More preferably, R$^1$ to R$^{12}$ have one or more of a hydrogen atom, a fluorine atom, a cyano group, a sulfone group and the like. When two or more organic groups are bonded to each other, the bond may be formed between main skeletons of the organic groups, between the main skeleton of the organic group and the above functional group, or between the functional groups.

Examples of a chain onium cation include quaternary ammoniums such as tetramethylammonium, tetraethylammonium, tetrapropylammonium, tetrabutylammonium, tetraheptylammonium, tetrahexylammonium, tetraoctylammonium, triethylmethylammonium, methoxyethyldiethylmethylammonium, trimethylphenylammonium, benzyltrimethylammonium, benzyltriethylammonium, benzyltributylammonium, dimethyldistearylammonium, diallyldimethylammonium, (2-methoxyethoxy)methyltrimethylammonium, diethylmethyl(2-methoxyethyl)ammonium and tetrakis(pentafluoroethyl)ammonium; tertiary ammoniums such as trimethylammonium, triethylammonium, tributylammonium, diethylmethylammonium, dimethylethylammonium and dibutylmethylammonium; secondary ammoniums such as dimethylammonium, diethylammonium and dibutylammonium; primary ammoniums such as methylammonium, ethylammonium, butylammonium, hexylammonium and octylammonium; and ammonium compounds such as N-methoxytrimethylammonium, N-ethoxytrimethylammonium, N-propoxytrimethylammonium and NH$_4$. Among these chain onium cations, ammonium, trimethylammonium, triethylammonium, tributylammonium, triethylmethylammonium, tetraethylammonium and diethylmethyl(2-methoxyethyl)ammonium are preferable as the chain onium cations.

Examples of the salt containing an onium cation include halides, hydroxides, carbonates, hydrogen carbonates and the like of the onium cation. Also, compounds which form a salt containing an onium cation in the reaction system of the cation exchange step may be used as a raw material.

Examples of the solvents usable in the cation exchange step include those exemplified in the above-mentioned fluorination step.

There is no particular limitation on timing of performing the cation exchange step, and the step can be performed in any stage depending on the situation. For example, the step may be performed before the fluorination step or after the fluorination step, but is preferably performed after the fluorination step.

Also, there is no limitation on the number of performing the cation exchange step, and the step may be performed once or twice or more repeatedly. For example, a cation of chlorosulfonyl imides or fluorosulfonyl imides may be exchanged for an alkali metal cation by one cation exchange step, or an alkali metal salt may be obtained by obtaining an onium salt of chlorosulfonyl imides or fluorosulfonyl imides in the first cation exchange step and performing the second cation exchange step.

In any of the fluorination reaction step and the cation exchange reaction step, the concentration of a compound having a sulfonyl imide skeleton contained in the reaction solution (for example, fluorosulfonyl imide, fluorosulfonylimide salt, etc.) is preferably from 1% by mass to 70% by mass. When the concentration is too high, the reaction may become ununiform. In contrast, when the concentration is too low, it is not economical because of low productivity per 1 batch. The concentration is more preferably from 3% by mass to 60% by mass, and still more preferably from 5% by mass to 50% by mass.

A step of bringing into contact with an aqueous alkali solution may be provided after the above fluorination step. By providing the alkali contact step, it is possible to remove the impurities contained in the product. As used herein, "after the fluorination step" is not limited only to "immediately after the fluorination step", but also includes "after the cation exchange step following the fluorination step".

As the above aqueous alkali solution, an aqueous solution of a basic substance may be used. Examples of the basic substance include ammonia; aliphatic amines such as primary, secondary or tertiary alkylamines having an alkyl group of 1 to 8 carbon atoms, and alkylenediamines having an alkylene group of 1 to 8 carbon atoms; alkanolamines; alicyclic amines; aromatic amines; ethylene oxide adducts of these amines; formamidine; guanidine; amidine; heterocyclic amines; hydroxides, carbonates, phosphates, silicates, borates, formates, acetates, stearates, palmitates, propionates and oxalates of alkali metals or alkali earth metals; and the like.

[Concentration Step]

The concentration step is a step in which the solvent is removed from the reaction solution after the cation exchange step to concentrate a solution of the alkali metal salt of fluorosulfonyl imide formed. In the present invention, the concentration step is performed by (1) the method for bubbling a gas into the reaction solution (bubbling method), and/or, (2) the thin film distillation method.

In the present invention, the concentration step includes, in addition to removal by distillation of a part of the solvent from the solution of the alkali metal salt of fluorosulfonyl imide obtained (reaction solution), removal by distillation of the solvent from the reaction solution until the objective alkali metal salt of fluorosulfonyl imide is obtained as a solid. Accordingly, the product obtained in the concentration step is a concentrated solution of the alkali metal salt of fluorosulfonyl imide; a solid (powder) of the alkali metal salt of fluorosulfonyl imide; or a concentrated solution (solution in a slurry state) in which a part of the alkali metal salt of fluorosulfonyl imide is present in a solid state.

First, the concentration step employing the bubbling method of (1) is described. In the bubbling method, an evaporation area can be increased by passing a gas through the reaction solution, and therefore, evaporation of the reaction solvent is accelerated and the reaction solvent can be removed rapidly from the reaction solution. In this case, reaction devices which can be used in the concentration step may be those having a means to introduce a gas into the reaction solution and a means to discharge the reaction solvent out of the system, and there is no particular limitation on the devices. Examples thereof include a tank type reactor, a tank type reactor capable of reducing pressure and the like.

As a gas passing (bubbling) through the reaction solution, an inert gas such as helium, nitrogen and argon, dried air and a mixed gas thereof and others can be used. A nitrogen gas is preferred from the viewpoints of quality of the product and safety. The amount of the gas passed through the reaction solution may be determined suitably depending on the concentration of the fluorosulfonyl compound (alkali metal salt of fluorosulfonyl imide) in the reaction solution. For example, the amount is preferably from 0.001 mL/minute to 10,000 mL/minute per 1 g of the solution of the alkali metal salt of fluorosulfonyl imide. The amount is more preferably from 0.005 mL/minute to 1,000 mL/minute, and still more preferably from 0.05 mL/minute to 100 mL/minute. From the viewpoint of acceleration of evaporation of the reaction solvent, bubbles of the gas supplied into the reaction solution preferably have a relatively small diameter. In this case, there is no particular limitation on a means to form bubbles. For example, bubbles may be formed by passing a supply gas through a filter such as a glass filter, or a gas generator such as a fine gas generator may be used.

The concentration step may be performed while heating the reaction solution, in order to further increase the concentration efficiency of the alkali metal salt of fluorosulfonyl imide. The heating temperature may be determined suitably depending on the reaction solvent used, and is preferably 30° C. or higher and 150° C. or lower from the viewpoint of suppression of decomposition of the alkali metal salt of fluorosulfonyl imide. The temperature is more preferably 50° C. or higher, and more preferably 120° C. or lower. When the temperature is too low, a removal efficiency for the reaction solvent can not be obtained. On the other hand, when the temperature is too high, the alkali metal salt of fluorosulfonyl imide may be decomposed.

There is no particular limitation on the other conditions in the concentration step adopting the bubbling method (for example, a diameter of a nozzle used for bubbling of the gas through the reaction solution, etc.). Conditions other than the above ones may be determined suitably depending on the size of a device used and the concentration of the alkali metal salt of fluorosulfonyl imide in the reaction solution.

Next, the concentration step adopting the thin film distillation method of (2) is described.

The thin film distillation method is a method in which a thin film of a subjected solution is formed and heated to separate components contained in the subjected solution into an evaporating content and a non-evaporating content. Accordingly, in the concentration step adopting the thin film distillation method, the solvent is separated from the reaction solution after the cation exchange step by thin film distillation to concentrate the solution of the alkali metal salt of fluorosulfonyl imide.

In this case, the concentration step is performed using a thin film distillator. The thin film distillator may be a device having a means to form a thin film of the reaction solution, a means to heat the thin film formed, a means to recover an evaporating content (reaction solvent), and a means to recover a non-evaporating content (alkali metal salt of fluorosulfonyl imide). Also, the device may have a circulating means to return a concentrated liquid removed from the thin film distiller again to the thin film distillator, by which concentration can be performed repeatedly.

There is no particular limitation on the method for forming a thin film, and any conventionally known methods such as falling, centrifuging, stirring, rotating, blade, and climbing methods can be adopted. Specific examples of the thin film distillator include "short path distillation device" (manufactured by UIC GmbH), "Wiprene (registered trademark)", "Exeva (registered trademark)" (manufactured by Kobelco Eco-Solutions Co., Ltd.), "Kontro", "Diagonal-blade Kontro", "Sevcon (registered trademark)" (these are manufactured by Hitachi Plant Technologies, Ltd.), "Hi-Evaolator (registered trademark)" (manufactured by Sakura Seisakusho, Ltd.), "thin film distiller", "Viscon", "Filmtruder" (these are manufactured by Kimura Chemical Plants Co., Ltd.), "Hi-U Brusher", "EVA Reactor", "Recovery" (these are manufactured by Kansai Chemical Engineering Co., Ltd.), "NRH" (manufactured by Nitinan Engineering Co., Ltd.), "Evapor (registered trademark)" (manufactured by Okawara MFG. Co., Ltd.), and the like.

The temperature upon the thin film distillation may be determined suitably depending on the reaction solvent used, and is preferably 30° C. or higher and 150° C. or lower from the viewpoint of suppression of decomposition of the alkali metal salt of fluorosulfonyl imide. The temperature is more preferably 40° C. or higher, still more preferably 50° C. or higher, more preferably 120° C. or lower, and still more preferably 110° C. or lower. When the thin film temperature is too low, a removal efficiency for the reaction solvent can not be obtained. On the other hand, when the temperature is too high, the alkali metal salt of fluorosulfonyl imide may be decomposed. Also, even when the thin film distillation method is employed, the heat quantity applied to an alkali metal salt of fluorosulfonyl imide is preferably within the above range.

The concentration step may be performed while passing a gas through a thin film distiller, in order to further increase the concentration efficiency of the alkali metal salt of fluorosulfonyl imide. As the gas, an inert gas such as nitrogen or argon is preferably used, and nitrogen is more preferably used.

There is no particular limitation on the other conditions in the concentration step by the thin film distillation method. For example, the supply rate of the reaction solution into the thin film distillator may be determined suitably depending on the size of a device used and the concentration of the alkali metal salt of fluorosulfonyl imide in the reaction solution.

When either of the bubbling method or the thin film distillation method is employed, the concentration step may be performed under reduced pressure from the viewpoint of efficiently performing the concentration step. By controlling the degree of reduced pressure, it is possible to remove the reaction solvent efficiently even at low temperature, and also to prevent thermal decomposition of the alkali metal salt of fluorosulfonyl imide. There is no particular limitation on the degree of reduced pressure, and the degree may be adjusted suitably depending on the kind of the reaction solvent. For example, the degree is preferably 40 kPa or less, more preferably 15 kPa or less, and still more preferably 5 kPa or less.

When the reaction solvent is present in a large amount, a part of the reaction solvent may be removed before the concentration step. A difficulty of removal of the reaction solvent from the reaction solution because of a significant interaction between the alkali metal salt of fluorosulfonyl imide and the solvent occurs after a time point at which the amount of the reaction solvent is 150% by mass or less based on of the alkali metal salt of fluorosulfonyl imide. Accordingly, by reducing the amount of the reaction solution as much as possible, it is possible to perform the concentration step efficiently. Also, the concentration step may be performed while stirring the reaction solution. In the concentration step, both the above bubbling method and the thin film distillation method may be performed sequentially (there is no particular limitation on the order of performing both methods). Alternatively, any one of them may be performed. From the viewpoint of prevention of thermal decomposition of the alkali metal salt of fluorosulfonyl imide, the thin film distillation method is preferred which can perform the concentration step in a relatively short time.

From the viewpoint of prevention of decomposition of the alkali metal salt of fluorosulfonyl imide by heating in the concentration step, the heat quantity applied to the concentration step is preferably 1,000,000 J or less, more preferably 500,000 J or less, and still more preferably 100,000 J or less, per 1 g of the alkali metal salt of fluorosulfonyl imide, when either of the above bubbling method or the thin film distillation method is employed. The above heat quantity does not include the heat quantity applied to the reaction solution for removing a part of the reaction solvent before subjecting to the concentration step.

In the present invention, the heat quantity applied to the reaction solution in the concentration step represents the heat quantity applied to the alkali metal salt of fluorosulfonyl imide. The above heat quantity may be determined based on power consumption of a device used in the concentration step (see the nominal values of device manufacturer), the amount of the alkali metal salt of fluorosulfonyl imide contained in the reaction solution and a heating time. Specifically, the heat quantity applied to the reaction solution in the concentration step may be calculated and converted into the heat quantity applied per 1 g of the alkali metal salt of fluorosulfonyl imide.

[Drying and Powderizing Step]

Although the concentrated solution of the alkali metal salt of fluorosulfonyl imide obtained in the concentration step may serve as the product at it is, the alkali metal salt of fluorosulfonyl imide may be powderized (Powderizing and drying step) for the purpose of high stability upon storage and easy distribution of the product. When a solid state of the alkali metal salt of fluorosulfonyl imide is obtained in the concentration step, the solid obtained may be dried in a drying device as it is, or subjected to the drying, powderizing step after dissolving it in a solvent capable of dissolving the alkali metal salt of fluorosulfonyl imide.

There is no particular limitation on the method for drying and powderizing the alkali metal salt of fluorosulfonyl imide, and examples thereof include (1) a method in which the above concentration step is continued until an alkali metal salt of fluorosulfonyl imide is precipitated and the salt is separated, dried and powderized; (2) a method in which the concentrated solution obtained in the concentration step is allowed to stand as it is or while cooling to 30° C. or lower if needed to precipitate an alkali metal salt of fluorosulfonyl imide and the salt is separated, dried and powderized; (3) a method in which a solvent is added to the concentrated liquid to precipitate an alkali metal salt of fluorosulfonyl imide and the salt is separated by filtering, dried and powderized; and the like.

The solvents which may be used in the above mentioned method (3) are those other than the above-mentioned reaction solvents and may be those which are less likely to form solvation with the alkali metal salt of fluorosulfonyl imide. Specific examples of the solvent, which may be used in the above mentioned method (3), include aromatic hydrocarbon solvents such as toluene, o-xylene, m-xylene, p-xylene, ethylbenzene, isopropylbenzene, 1,2,4-trimethylbenzene, 1,3,5-trimethylbenzene, 1,2,3-trimethylbenzene, chlorobenzene and dichlorobenzene; and aliphatic hydrocarbon solvents such as hexane, heptane, octane, nonane, decane, undecane, dodecane, decalin and dichloromethane. These solvents are preferably added in an amount of 20 times by mass or less and more preferably 10 times by mass or less based on 1 part by mass of the concentrated solution.

Subsequently, the alkali metal salt of fluorosulfonyl imide precipitated is separated from the reaction solvent and the like by decantation, centrifugation, filtration and the like, and then dried. There is no particular limitation on a method for drying the alkali metal salt of fluorosulfonyl imide, and conventionally known drying devices can be used. The temperature upon drying is preferably from 0° C. to 100° C. The temperature is more preferably 10° C. or higher, and still more preferably 20° C. or higher, more preferably 80° C. or lower, and still more preferably 60° C. or lower.

The drying of the alkali metal salt of fluorosulfonyl imide may be performed while supplying a gas to a drying device. Examples of the gases which can be used include those used in the concentration step such as inert gases including nitrogen and argon as well as dry air.

[Recovery Step]

In the production method of the present invention, the step of recovering the alkali metal salt of fluorosulfonyl imide and the compound having a sulfonyl imide skeleton separated from the products in the above mentioned steps may be employed. In particular, since a dissolved alkali metal salt of fluorosulfonyl imide is contained in a waste liquid discharged in the concentration step employing the thin film distillation method and in a solution (mother liquid) from which the alkali metal salt of fluorosulfonyl imide precipitated in the above powderizing, drying step is removed, it is possible to improve the yield of the alkali metal salt of fluorosulfonyl imide by recovering the dissolved alkali metal salt.

When the purity of the alkali metal salt of fluorosulfonyl imide obtained in the above drying, powderizing step is low, the salt may be purified alone. Alternatively, a solid state (powder) of the alkali metal salt of fluorosulfonyl imide may be mixed with the recovered solution (the above waste liquid and the mother liquid). This is because the operations in the above drying, powderizing step also correspond to purification operations such as a crystallization method and a reprecipitation method, there can be improved the purity of the alkali metal salt of fluorosulfonyl imide simultaneously with the recovery of the alkali metal salt of fluorosulfonyl imide from the waste liquid and the mother liquid.

There is no particular limitation on a method for purifying the recovered alkali metal salt of fluorosulfonyl imide. The alkali metal salt of fluorosulfonyl imide may be recovered by purifying the solution recovered from each step alone or in mixture with other solutions. Further, the recovered solution may be supplied to any step of the cation exchange step, the concentration step, and the powderizing, drying step. From the viewpoint of productivity, the recovered solution is preferably supplied to the concentration step.

The alkali metal salt of fluorosulfonyl imide obtained by the above method may be subjected to a purification step, if needed, in order to further improve its purity. As the purification step, any conventionally known purification methods can be employed.

<Electrolytic Solution>

The present invention also encompasses an electrolytic solution comprising the above alkali metal salt of fluorosulfonyl imide and a medium. As described above, the alkali metal salt of fluorosulfonyl imide of the present invention has reduced contents of impure ions and water, and therefore, decomposition of the electrolytic solution is less likely to arise. Accordingly, an electrochemical device having the electrolytic solution of the present invention as an ionic conductor can be an electrochemical device having stable properties for a long period.

As the medium, a non-protonic solvent, a polymer and the like are exemplified. As the non-protonic solvent, a solvent is preferably those having high dielectric constant, high solubility for electrolytic salts (alkali metal salt of fluorosulfonyl imide and other electrolytes described below), boiling point of 60° C. or higher, and a wide range of electrochemical stability. The non-protonic solvent is more preferably organic solvents with low water content (non-aqueous solvent). Specifically, the water content is preferably 250 ppm or less, more preferably 100 ppm or less, and still more preferably 50 ppm or less. As an organic solvent having a low water content, commercially available dehydrated solvents and the like can be used. Examples of such organic solvent include ethers such as ethylene glycol dimethyl ether (1,2-dimethoxyethane), ethylene glycol diethyl ether, tetrahydropyran, 2-methyltetrahydrofuran, 2,6-dimethyltetrahydrofuran, tetrahydropyran, crown ether, triethylene glycol dimethyl ether, tetraethylene glycol dimethyl ether, 1,4-dioxane and 1,3-dioxolane; chain carbonic acid esters such as dimethyl carbonate, carbonic acid ethyl methyl ester (ethyl methyl carbonate), Carbonic Acid Diethyl Ester (diethyl carbonate), diphenyl carbonate, and methyl phenyl carbonate; cyclic carbonate esters such as ethylene carbonate, propylene carbonate, ethylene 2,3-dimethylcarbonate, butylene carbonate, vinylene carbonate, and ethylene 2-vinylcarbonate; aliphatic carboxylic acid esters such as methyl formate, methyl acetate, propionic acid, methyl propionate, ethylacetate, propyl acetate, butyl acetate, and amyl acetate; aromatic carboxylic acid esters such as methyl benzoate and ethyl benzoate; carboxylic acid esters such as γ-butyrolactone, γ-valerolactone, and δ-valerolactone; phosphoric acid esters such as trimethyl phosphate, ethyl dimethyl phosphate, diethyl methyl phosphate, and triethyl phosphate; nitriles such as acetonitrile, propionitrile, methoxypropionitrile, glutaronitrile, adiponitrile, 2-methylglutaronitrile, valeronitrile, butyronitrile, and isobutyronitrile; amides such as N-methylformamide, N-ethylformamide, N,N-dimethylformamide, N,N-dimethylacetamide, N-methylpyrrolidinone, N-methylpyrrolidone, and N-vinylpyrrolidone; sulfur compounds such as dimethylsulfone, ethylmethylsulfone, diethylsulfone, sulfolane, 3-methylsulfolane, and 2,4-dimethylsulfolane; alcohols such as ethylene glycol, propylene glycol, ethylene glycol monomethyl ether, and ethylene glycol monoethyl ether; sulfoxides such as dimethyl sulfoxide, methyl ethyl sulfoxide, and diethyl sulfoxide; aromatic nitriles such as benzonitrile and tolunitrile; nitromethane; 1,3-dimethyl-2-imidazolidinone; 1,3-dimethyl-3,4,5,6-tetrahydro-2(1H)-pyrimidinone; 3-methyl-2-oxazolidinone, etc., and preferably these solvents can be used individually or in combination. Among these solvents, carbonic acid esters, aliphatic carboxylic acid esters, carboxylic acid esters, and ethers are more preferable; and carbonic acid esters even more preferable.

Examples of a polymer, which is used as the medium, include polyether-based polymers such as polyethylene oxide (PEO) and polypropylene oxide; methacrylic polymers such as polymethyl methacrylate (PMMA); nitrile-based polymers such as polyacrylonitrile (PAN); fluoropolymers such as polyvinylidene fluoride (PVDF) and polyvinylidene fluoride-hexafluoropropylene; and their copolymers. Polymer gel obtained by mixing these polymers and other organic solvents may be used as the medium of the present invention. As the other organic solvent, the above mentioned non-protonic solvent may be used.

Examples of a method for producing an electrolytic solution, in the case of using the above polymer gel as a medium, include a method in which a solution prepared by dissolving an electrolyte such as an alkali metal salt of fluorosulfonyl imide in the above-mentioned non-protonic solvent is added dropwise to a polymer film formed by a conventionally known method to allow the electrolyte and the non-protonic solvent to be impregnated and supported; a method in which a polymer and an electrolyte are melted and mixed at a temperature equal to or higher than the melting point of the polymer, a film is then formed and the non-protonic solvent is impregnated into the film; a method in which a solution of an electrolyte previously dissolved in the non-protonic solvent is mixed with a polymer, a film of the mixture is then formed by a casting method or a coating method, and the non-protonic solvent is volatilized (the above aspects are a gel electrolyte); a method in which a polymer and an electrolyte are melted and mixed at a temperature equal to or higher than the melting point of the polymer, and the mixture is then molded (true polymer electrolyte); and the like.

The amount of the medium used is preferably from 50 parts by mass to 99.9 parts by mass based on 100 parts by mass of the total amount of the electrolyte (alkali metal salt of fluorosulfonyl imide and other electrolytes) and the medium. The amount is more preferably from 60 parts by mass to 99.5 parts by mass, and still more preferably from 70 parts by mass to 99 parts by mass. When the amount of the medium is too small, it may be difficult to obtain sufficient ionic conductivity. On the other hand, when the amount is too large, an ion concentration in the ion-conducting material easily changes by volatilization of the solvent, and it may be difficult to obtain stable ionic conductivity.

The electrolytic solution according to the present invention may contain only the above alkali metal salt of fluorosulfonyl imide as an electrolyte. Alternatively, the electrolytic solution may contain other electrolytes in addition to the alkali metal salt of fluorosulfonyl imide. By using the other electrolytes, an absolute amount of ions in the electrolytic solution can be increased and the electric conductivity can be improved.

As other electrolytes, preferable are those having high dissociation constant in an electrolyte solution and containing an anion difficult to be solvated with the non-protonic solvent described above. Examples of cation species constituting the other electrolytes include alkali metal ions such as $Li^+$, $Na^+$, and $K^+$; alkaline earth metal ions such as $Ca^{2+}$ and $Mg^{2+}$; and onium cations, and particularly lithium ion is preferable. On the other hand, examples of the anion species include $PF_6^-$, $BF_4^-$, $ClO_4^-$, $AlCl_4^-$, $C[(CN)_3]^-$, $N[(CN)_2]^-$, $B[(CN)_4]^-$, $N[(SO_2CF_3)_2]^-$, $CF_3(SO_3)^-$, $C[(CF_3SO_2)_3]^-$, $AsF_6^-$, $SbF_6^-$, and dicyanotriazolate ion (DCTA). Among them, $PF_6^-$ and $BF_4^-$ are more preferable and $PF_6^-$ is furthermore preferable.

The amount of the above other electrolytes to be present is preferably 0.1% by mass or more and 99% by mass or less in 100% by mass of the total amount of the alkali metal salt of fluorosulfonyl imide and the other electrolytes. When the amount of the other electrolytes is too small, it may be difficult to obtain effects caused by using the other electrolytes (for example, an absolute amount of ions becomes insufficient and electric conductivity becomes small). In contrast, when the amount of the other electrolytes is too large, transfer of ions may be inhibited largely. The amount is more preferably 1% by mass or more, still more preferably 5% by mass or more, more preferably 95% by mass or less, and still more preferably 90% by mass or less.

The electrolyte concentration (total amount of an alkali metal salt of fluorosulfonyl imide and other electrolytes) in the electrolytic solution according to the present invention is preferably 0.1% by mass or more and preferably the saturation concentration or less. The concentration of less than 0.1% by mass is not preferred because of low ionic conductivity. The concentration is more preferably 0.5% by mass or more, and still more preferably 1% by mass or more. Also, the electrolyte concentration in the electrolytic solution is more preferably less than 50% by mass, still more preferably 40% by mass or less, and still further preferably 30% by mass or less.

In the electrolytic solution of the present invention, the content of sulfate ions is preferably 1,500 ppm or less. As described above, the sulfate ions correspond to impurities against the electrolytic solution of the present invention. When the content of such impurities is large, it may be difficult to obtain desired properties where the electrolytic solution of the present invention is used in an electric storage device. The amount of the sulfate ions in the electrolytic solution of the present invention is more preferably 500 ppm or less, and still more preferably 250 ppm or less. The content of the sulfate ions is preferably as low as possible, and most preferably 0 ppm. For example, the lower limit of the content of the sulfate ions may be about 0.5 ppm, or may be 1 ppm or less. This is because the above-mentioned problem is less likely to arise when the content is within that range.

The electrolytic solution of the present invention is preferably such that the water content, the contents of the solvent, the fluorine ions, the chloride ions and the potassium ions are also reduced in addition to the sulfate ions. Specifically, the water content is preferably 250 ppm or less, more preferably 150 ppm or less, and still more preferably 50 ppm or less, in the electrolytic solution of the present invention. The content of the residual solvent is preferably 2,000 ppm or less, and more preferably 1,500 ppm or less in the electrolyte of the present invention. The content of the fluorine ions is preferably 500 ppm or less, more preferably 400 ppm or less, and still more preferably 150 ppm or less, in the electrolytic solution of the present invention. The content of the chloride ions is preferably 100 ppm or less, and more preferably 50 ppm or less, in the electrolytic solution of the present invention. The content of the potassium ions is preferably 5,000 ppm or less, more preferably 4,000 ppm or less, further more preferably 2,000 ppm or less, still more preferably 500 ppm or less, still further preferably 250 ppm or less, particularly preferably 100 ppm or less, and most preferably 50 ppm or less, in the electrolytic solution of the present invention.

All the water content, the contents of the solvent, the fluorine ions, the chloride ions and the potassium ions are most preferably 0 ppm in the electrolytic solution of the present invention, respectively. For example, the lower limit of each content may be about 0.5 ppm, or may be about 1 ppm. This is because, when the water content, the contents of the solvent and the fluorine ions are within the above range, problems originating from these impurities are less likely to arise even when the electrolytic solution of the present invention is used in various electrochemical devices.

The material contained in the electrolytic solution of the present invention as a medium is not included in the above residual solvent. A solvent included in the above residual solvent means the reaction solvent and water used in the production step of the alkali metal salt of fluorosulfonyl imide. Incidentally, when the reaction solvent used in the production step is identical with a solvent contained as the medium of the electrolytic solution, it means that the solvent is not included in the residual solvent.

The contents of the above ions, water and residual solvent contained in the electrolytic solution of the present invention can be measured, for example, by an ICP emission spectrometric analysis method, ion chromatography, a Karl Fischer moisture meter, and gas chromatography.

EXAMPLES

The present invention will be described more specifically by way of experimental examples. As a matter of course, the present invention is not limited by the following experimental examples, and it is also possible to perform the present invention by adding any suitable modifications to the invention within a range corresponding to the above- or below-mentioned gist. All such modifications are encompassed within the technical scope of the present invention.

[NMR Measurement]

$^1$H-NMR and $^{19}$F-NMR were measured using "Unity Plus-400" manufactured by Varian (internal standard substance: trifluoromethylbenzene, solvent: deuterated acetonitrile, number of scans: 16 times).

[ICP Emission Spectrometric Analysis Method]

An aqueous solution having a 1% by mass concentration prepared by mixing 0.1 g of the fluorosulfonyl imide salt obtained in the following example with 9.9 g of ultrapure water was used as a measuring sample, and a multi-type ICP emission spectrometer ("ICPE-9000" manufactured by Shimadzu Corporation) was used.

Experimental Example 1

Experimental Example 1-1

[Fluorination Step]

To a reaction vessel A (internal capacity 10 L) made of Pyrex (registered trademark) and equipped with a stirring device, 1800 g of butyl acetate was added under a nitrogen current, and 200 g (934 mmol) of bis(chlorosulfonyl)imide was added dropwise to the reaction vessel A at room temperature (25° C.)

To the resultant solution of bis(chlorosulfonyl)imide in butyl acetate, 101 g (982 mmol, 1.05 equivalents relative to bis(chlorosulfonyl)imide) of zinc fluoride was added at once at room temperature, and the mixture was stirred at room temperature for 6 hours until the zinc fluoride was completely dissolved.

[Cation Exchange Step 1—Synthesis of Ammonium Salt]

To a reaction vessel B (internal capacity 10 L) made of Pyrex (registered trademark) and equipped with a stirring device, 540 g (7928 mmol, 8.49 equivalents relative to bis(chlorosulfonyl)imide) of 25% by mass ammonia water was added. To the reaction vessel B, the reaction solution in the reaction vessel A was added dropwise while stirring the ammonia water at room temperature. After the completion of the dropwise addition of the reaction solution, stirring was terminated. Then, the aqueous layer containing by-products such as zinc chloride was removed from the reaction solution separated into two layers of the aqueous layer and the butyl acetate layer to obtain a solution of ammonium bis(fluorosulfonyl)imide in butyl acetate as the organic layer. Next, $^{19}$F-NMR measurement (solvent: deuterated acetonitrile) was performed using the resultant organic layer as a sample. A crude yield amount of ammonium bis(fluorosulfonyl)imide contained in the organic layer was determined (756 mmol) by comparing the amount of trifluoromethylbenzene added as an internal standard substance and an integrated value of the peak originating from the internal standard substance with an integrated value of the peak originating from the objective product in the resultant chart. $^{19}$F-NMR (solvent: deuterated acetonitrile): δ56.0

[Cation Exchange Step 2—Synthesis of Lithium Salt]

Next, 242 g (1516 mmol in terms of Li) of an aqueous solution of 15% by mass lithium hydroxide was added so that the amount of lithium was 2 equivalents relative to ammonium bis(fluorosulfonyl)imide contained in the resultant organic layer, and the mixture was stirred at room temperature for 10 minutes. Subsequently, the aqueous layer was removed from the reaction solution to obtain a solution of lithium bis(fluorosulfonyl)imide in butyl acetate.

By the ICP emission spectrometric analysis method using the resultant organic layer as a sample, it was confirmed that the ammonium cation of fluorosulfonyl imide was exchanged for lithium ion. The concentration of lithium bis(fluorosulfonyl)imide in the organic layer was 7% by mass (yield amount: 127 g, yield: 73%).

The concentration of fluorosulfonyl imide was determined by performing $^{19}$F-NMR measurement (solvent: deuterated acetonitrile) using the resultant organic layer as a sample, and comparing, in the chart showing the results of the measurement, the amount of trifluoromethylbenzene added as an internal standard substance and an integrated value of the peak originating from the internal standard substance with an integrated value of the peak originating from the objective product.

[Concentration Step]

Firstly, the solution of lithium bis(fluorosulfonyl)imide obtained in the cation exchange step was charged into a rotary evaporator ("REN-1,000" manufactured by IWAKI), the solvent was distilled off under reduced pressure to obtain 282 g of a solution of lithium bis(fluorosulfonyl)imide (concentration: 45% by mass).

Next, a flask (capacity: 500 mL), into which 200 g of a solution of a 45% by mass concentration of lithium bis(fluorosulfonyl)imide in butyl acetate was charged, was set in a rotary evaporator ("REN-1,000" manufactured by IWAKI) equipped with a gas introduction tube and a decompression device. Rotation (100 rpm) was started while blowing a nitrogen gas into the solution in the flask at 500 mL/minute and while heating in a constant temperature water tank set at 60° C. Subsequently, the pressure of the inside of the device was gradually reduced down to 933 Pa, and the concentration step was performed for 12 hours. The concentration of the resultant solution was 72% by mass. The heat quantity applied to the concentration step was 72,000 J based on 1 g of lithium bis(fluorosulfonyl)imide.

[Powderizing and Drying Step]

To 125 g of the resultant concentrated solution, 125 g of toluene was added, and the mixture was allowed to stand at 25° C. for 1 hour to precipitate a solid of lithium bis(fluorosulfonyl)imide. The resultant solid was filtered and vacuum-dried at 50° C. to obtain lithium bis(fluorosulfonyl)imide (yield amount: 68 g, yield: 76% (from concentration step)).

Experimental Example 1-2

A test tube having an outer diameter of 15 mm was equipped with a gas introduction tube and a decompression device. Then, 5 g of the solution of a 45% by mass concentration of lithium bis(fluorosulfonyl)imide in butyl acetate obtained in the cation exchange step 2 of Experimental Example 1-1 was charged into the test tube, and the pressure of the inside of the test tube was gradually reduced down to 2666 Pa. Concentration was started while keeping the degree of reduced pressure, while blowing a nitrogen gas into the solution at a flow rate of 1 mL/minute in a standard condition, and while heating in a constant temperature water tank set at 65° C. When the concentration step was performed for 2.5 hours, the concentration of lithium bis(fluorosulfonyl)imide in the resultant solution was 85% by mass. The heat quantity applied to the concentration step was 17,000 J based on 1 g of lithium bis(fluorosulfonyl)imide.

Experimental Example 1-3

Lithium bis(fluorosulfonyl)imide was produced in the same manner as in Experimental Example 1-2, except that, in the concentration step, air was used in place of the nitrogen gas (supply rate: about 1 mL/minute in a standard condition), the temperature of the constant temperature water tank was changed to 75° C., and the degree of reduced pressure was set at 667 Pa. In this case, the time of performing the concentration step was 2 hours, and the concentration of lithium bis (fluorosulfonyl)imide in the solution obtained in the concentration step was 88% by mass. The heat quantity applied to the concentration step was 15,000 J based on 1 g of lithium bis(fluorosulfonyl)imide.

Experimental Example 1-4

Lithium bis(fluorosulfonyl)imide was produced in the same manner as in Experimental Example 1-2, except that, in the concentration step, air was used in place of the nitrogen gas (supply rate: about 1 mL/minute in a standard condition), the temperature of the constant temperature water tank was changed to 50° C., and the degree of reduced pressure was set at 667 Pa. In this case, the time of performing the concentration step was 10 hours, and the concentration of lithium bis(fluorosulfonyl)imide in the solution obtained in the concentration step was 84% by mass. The heat quantity applied to the concentration step was 50,000 J based on 1 g of lithium bis(fluorosulfonyl)imide.

Experimental Example 1-5

Lithium bis(fluorosulfonyl)imide was produced in the same manner as in Experimental Example 1-2, except that, in the concentration step, the nitrogen gas was not blown into the solution, the temperature of the constant temperature water tank was changed to 50° C., and the degree of reduced pressure was set at 667 Pa. In this case, the time of performing the concentration step was 20 hours, and the concentration of lithium bis(fluorosulfonyl)imide in the solution obtained in the concentration step was 60% by mass. The heat quantity applied to the concentration step was 100,000 J based on 1 g of lithium bis(fluorosulfonyl)imide.

The concentration conditions and the results of Experimental Examples 1-1 to 1-5 are shown in Table 1 and the results of Experimental Examples 1-2 to 1-5 are shown in FIG. 1. In FIG. 1, the amount of the reaction solvent is plotted against the concentration time.

while bubbling. It is also apparent that an alkali metal salt of fluorosulfonyl imide can be concentrated still further efficiently by performing the concentration step under reduced pressure. As is apparent from the comparison of Experimental Example 1-1 with 1-5, when the concentration step is performed while bubbling, an alkali metal salt of fluorosulfonyl imide can be concentrated efficiently even when the production scale is increased.

Experimental Example 2

Experimental Example 2-1

[Fluorination Step]

To a reaction vessel A (internal capacity 5 L) made of Pyrex (registered trademark) and equipped with a stirring device, 900 g of butyl acetate was added under a nitrogen current, and 100 g (467 mmol) of bis(chlorosulfonyl)imide was added dropwise to the reaction vessel A at room temperature (25° C.).

To the resultant solution of bis(chlorosulfonyl)imide in butyl acetate, 50.5 g (491 mmol, 1.05 equivalents relative to bis(chlorosulfonyl)imide) of zinc fluoride was added at once at room temperature, and the mixture was stirred at room temperature for 6 hours until the zinc fluoride was completely dissolved.

[Cation Exchange Step 1—Synthesis of Ammonium Salt]

To a reaction vessel B (internal capacity 1 L) made of Pyrex (registered trademark) and equipped with a stirring device, 270 g (3964 mmol, 8.49 equivalents relative to bis(chlorosulfonyl)imide) of 25% by mass ammonia water was added. To the reaction vessel B, the reaction solution in the reaction vessel A was added dropwise while stirring the ammonia water at room temperature. After the completion of the dropwise addition of the reaction solution, stirring was terminated. Then, the aqueous layer containing by-products such as zinc chloride was removed from the reaction solution separated, into two layers of the aqueous layer and the butyl acetate layer to obtain a solution of ammonium bis(fluorosulfonyl)imide in butyl acetate as the organic layer. Next, $^{19}$F-NMR measurement (solvent: deuterated acetonitrile) was performed using the resultant organic layer as a sample. A crude yield amount of ammonium bis(fluorosulfonyl)imide contained in the organic layer was determined (378 mmol) by comparing the amount of trifluoromethylbenzene added as an internal standard substance and an integrated value of the peak originating from the internal standard substance with an integrated value of the peak originating from the objective

TABLE 1

| | Reaction solution amount | Temperature | Degree of reduced pressure | Supply gas Kind | Supply rate | Performing time | Concentration after concentration step |
|---|---|---|---|---|---|---|---|
| Experimental Exam. 1-1 | 200 g | 60° C. | 933 Pa | $N_2$ gas | 500 mL/min | 12 hours | 72% |
| Experimental Exam. 1-2 | 5 g | 65 ° C. | 2666 Pa | $N_2$ gas | 1 mL/min | 2.5 hours | 85% |
| Experimental Exam. 1-3 | 5 g | 75° C. | 667 Pa | Air | 1 mL/min | 2 hours | 88% |
| Experimental Exam. 1-4 | 5 g | 50 ° C. | 667 Pa | Air | 1 mL/min | 10 hours | 84% |
| Experimental Exam. 1-5 | 5 g | 50 ° C. | 667 Pa | — | — | 20 hours | 60% |

As is apparent from the comparison of Experimental Examples 1-2 to 1-4 with Experimental Example 1-5, the product, i.e., an alkali metal salt of fluorosulfonyl imide can be concentrated in a short time according to the method of the present invention including the concentration step performed product in the resultant chart. $^{19}$F-NMR (solvent: deuterated acetonitrile): δ56.0

[Cation Exchange Step 2—Synthesis of Lithium Salt]

Next, 121 g (758 mmol in terms of Li) of an aqueous solution of 15% by mass lithium hydroxide was added so that the amount of lithium was 2 equivalents relative to ammonium bis(fluorosulfonyl)imide contained in the resultant organic layer, and the mixture was stirred at room temperature for 10 minutes. Subsequently, the aqueous layer was removed from the reaction solution to obtain a solution of lithium bis(fluorosulfonyl)imide in butyl acetate.

By the ICP emission spectrometric analysis method using the resultant organic layer as a sample, it was confirmed that the proton of fluorosulfonyl imide was exchanged for lithium ion. The concentration of lithium bis(fluorosulfonyl)imide in the organic layer was 7% by mass (yield amount: 63.5 g, yield: 73%).

The concentration of fluorosulfonyl imide was determined by performing $^{19}$F-NMR measurement (solvent: deuterated acetonitrile) using the resultant organic layer as a sample, and comparing, in the chart showing the results of the measurement, the amount of trifluoromethylbenzene added as an internal standard substance and an integrated value of the peak originating from the internal standard substance with an integrated value of the peak originating from the objective product.

[Concentration Step]

The solution of lithium bis(fluorosulfonyl)imide obtained in the cation exchange step was charged into a rotary evaporator ("REN-1,000" manufactured by IWAKI), the solvent was distilled under reduced pressure to obtain a solution of lithium bis(fluorosulfonyl)imide (141 g, concentration: 45% by mass).

Next, using a short path distillation device (model "KDL1", stirring type, evaporation area: 0.01 m$^2$, manufactured by UIC GmbH), under the conditions of a temperature of heating surface (temperature of thin film) of 100° C., a pressure of 1.333 kPa, and a rotor revolution of 300 rpm, 120 g of a solution of 45% by mass lithium bis(fluorosulfonyl) imide was supplied into the device at a supply rate of 2 g/minute to perform the thin film distillation. Then, the device was stopped, and the concentrated solution was removed. The concentration of lithium bis(fluorosulfonyl)imide in the resultant solution was 80% by mass. The heat quantity applied to the concentration step was 20,000 J based on 1 g of lithium bis(fluorosulfonyl)imide.

[Powderizing and Drying Step]

To 67.5 g of the resultant concentrated solution, 600 g of toluene was added, and the mixture was allowed to stand at 25° C. for 1 hour to precipitate a solid of lithium bis(fluorosulfonyl)imide. The resultant solid was filtered and vacuum-dried at 50° C. to obtain lithium bis(fluorosulfonyl)imide (yield amount: 38 g, yield: 56% (from concentration step)). At this time, the filtrate contains lithium bis(fluorosulfonyl) imide corresponding to 44% by mass in terms of the yield from the concentration step. The lithium bis(fluorosulfonyl) imide contained in the filtrate can be recovered by subjecting the filtrate again to the concentration step, and the powderizing, drying step.

Experimental Example 2-2

Lithium bis(fluorosulfonyl)imide was produced in the same manner as in Experimental Example 2-1, except that, in the concentration step, the temperature of thin film was changed to 75° C. In this case, the supply rate of the lithium bis(fluorosulfonyl)imide solution was 2 g/minute (thin film distillation time: 1 hour), and the concentration of the solution obtained in the concentration step was 63% by mass. The heat quantity applied to the concentration step was 15,000 J based on 1 g of lithium bis(fluorosulfonyl)imide.

Experimental Example 2-3

Lithium bis(fluorosulfonyl)imide was produced in the same manner as in Experimental Example 2-1, except that, in the concentration step, the temperature of thin film was changed to 50° C. In this case, the supply rate of the lithium bis(fluorosulfonyl)imide solution was 2 g/minute (thin film distillation time: 1 hour), and the concentration of the solution obtained in the concentration step was 58% by mass. The heat quantity applied to the concentration step was 10,000 J based on 1 g of lithium bis(fluorosulfonyl)imide.

Experimental Example 2-4

A rotary evaporator ("REN-1000" manufactured by IWAKI) was used in place of the short path distillation device. A flask, into which 10 g of a solution of a 45% by mass concentration of lithium bis(fluorosulfonyl)imide in butyl acetate was charged, was set in the rotary evaporator. Rotation (100 rpm) was started while heating the system in a constant temperature water tank set at 50° C., the pressure of the inside of the system was reduced down to 667 Pa, and the concentration step was performed for 20 hours. The concentration of the resultant solution was 60% by mass. Also, the heat quantity applied to the concentration step was 100,000 J based on 1 g of lithium bis(fluorosulfonyl)imide.

From the comparison of Experimental Examples 2-1 to 2-3 with Experimental Example 2-4, it is apparent that the product, i.e., lithium bis(fluorosulfonyl)imide can be concentrated in a short time in Experimental Examples 2-1 to 2-3 including the concentration step by thin film distillation, as compared with Experimental Example 2-4 not adopting the thin film distillation method.

Experimental Example 3

A solution of lithium bis(fluorosulfonyl)imide obtained by performing the fluorination step and the cation exchange steps 1 and 2 in the same manner as in Experimental Example 2-1 was charged into a rotary evaporator ("REN-1000" manufactured by IWAKI), and the solvent was distilled off under reduced pressure to obtain 140 g of a solution of lithium bis(fluorosulfonyl)imide (concentration 45% by mass). The resultant solution was poured into a Teflon (registered trademark)-coated stainless steel tray (length: 29 cm, width: 22 cm, height: 5 cm), and the tray was set in a shelf-type vacuum dryer and dried at a temperature of 50° C. for 7 days under a degree of reduced pressure of 150 Pa to obtain a solid of lithium bis(fluorosulfonyl)imide (yield amount: 63 g). The heat quantity applied upon concentration was 1,200,000 J based on 1 g of lithium bis(fluorosulfonyl)imide.

Experimental Example 4

The heat resistance (mass loss rate, 2% mass loss temperature) and the content of impurities were measured in each of the alkali metal salts of fluorosulfonyl imide obtained in Experimental Example 2-1 and Experimental Example 3 according to the following methods.

NMR measurement was performed according to the above procedures, and it was confirmed that the alkali metal salts of fluorosulfonyl imide obtained in Experimental Example 2-1 and Experimental Example 3 contained no unreacted raw material nor intermediate compound and all the salts were fluorinated and cation-exchanged.

[Heat Resistance 1: Mass Loss Rate]

About 20 mg of a sample was weighed and charged into an aluminum pan, the sample was kept at 100° C. for 8 hours under a dried air current (flow rate: 200 mL/minute) using a thermogravimetric/differential thermal analyzer ("EXSTAR TG/DTA 6200" manufactured by SII NanoTechnology Inc.), and the amount of mass loss was then measured.

[Heat Resistance 2: 2% and 1% Mass Loss Temperatures]

About 20 mg of a sample weighed and charged into an aluminum pan was heated at a flow rate of dried air of 200 mL/minute to a temperature range for measurement of from 25° C. to 450° C. at a temperature increase rate of 10° C./minute using a thermogravimetric/differential thermal analyzer ("EXSTAR TG/DTA6200" manufactured by SII NanoTechnology Inc.), and the condition of mass loss was observed.

The water contents of the samples used in the above heat resistances 1 and 2 evaluation, measured using "AQ-2000" manufactured by Hiranuma Sangyo Co. Ltd., were 64 ppm and 68 ppm, respectively.

[Content of Impurities]

A solution for measurement was prepared by 1,000-fold diluting 0.01 g of the alkali metal salt of fluorosulfonyl imide obtained in the above experimental example with ultrapure water (more than 18.2 Ω·cm). The amounts of halide ions ($F^-$, $Cl^-$) and sulfate ions ($SO_4^{2-}$) contained in the alkali metal salt of fluorosulfonyl imide were measured using ion chromatography system ICS-3000 (manufactured by Nippon Dionex K.K.).

Separation mode: ion exchange;
Eluent: 7 to 20 mM aqueous solution of KOH;
Detector: electric conductivity detector;
Column: anion analysis column, "Ion PAC AS-17C" (manufactured by Nippon Dionex K.K.)

The amounts of potassium ions, sodium ions and zinc ions were measured by the above ICP emission spectrometric analysis method.

lithium bis(fluorosulfonyl)imide and to dry it, the lithium bis(fluorosulfonyl)imide slightly decomposes during a long heating period, and decomposition products produced reduce the heat resistance of the lithium bis(fluorosulfonyl)imide.

In contrast, it is apparent that the heat resistance of lithium bis(fluorosulfonyl)imide was improved by 30° C. or higher in Experimental Example 2-1 adopting the method of the present invention, as compared with Experimental Example 3. The lithium bis(fluorosulfonyl)imide of Experimental Example 2-1 adopting the concentration step using the thin film distillation method had a mass loss of 0% even after kept at 100° C. for 8 hours.

It is considered that, in Experimental Example 2-1, the lithium bis(fluorosulfonyl)imide can be dried in a short heating time as compared with Experimental Example 3, and consequently, decomposition of the products is suppressed and decomposition of the products attributable to decomposition products (impurities) is less likely to arise, thereby showing satisfactory heat resistance.

Experimental Example 5

A solution of lithium bis(fluorosulfonyl)imide in butyl acetate was obtained by performing the fluorination step and the cation exchange steps 1 and 2 in the same manner as in Experimental Example 2-1.

In each experimental example of Experimental Examples 5-1 to 5-16, the concentration step and the drying, powderizing step were performed for an alkali metal salt of fluorosulfonyl imide in the same manner as in Experimental Example 2-1.

The content of impurities in the resultant alkali metal salt of fluorosulfonyl imide was measured in the same manner as in Experimental Example 4. The water content was measured according to the following method. The results are shown in Table 3. The results of Experimental Example 2-1 and Experimental Example 3 are also shown in Table 3.

It was also confirmed by the above NMR measurement that the alkali metal salts of fluorosulfonyl imide obtained in

TABLE 2

| | Heat Resistance 1 (%) | Heat Resistance 2 (° C.) | | Impurity content (ppm) | | | |
| | | 1% Mass | 2% Mass | | | | |
| | Mass loss rate | loss | loss | $F^-$ | $SO_4^{2-}$ | $K^-$ | $Cl^-$ |
|---|---|---|---|---|---|---|---|
| Experimental Exam. 2-1 | 0 | 209 | 235 | 13 | 147 | 3 | 3 |
| Experimental Exam. 2-2 | 0.5 | 185 | 215 | 376 | 837 | 3 | 11 |
| Experimental Exam. 3 | 3 | 170 | 207 | 1222 | 3393 | 16 | 10 |

From Table 2, the lithium bis(fluorosulfonyl)imide of Experimental Example 3, which was concentrated and dried in the shelf-type vacuum dryer, had a high content of impurities and low heat resistance as compared with Experimental Example 2-1. It is considered that, in the shelf-type vacuum dryer, lithium bis(fluorosulfonyl)imide needs to be heated for a long period (7 days) in order to remove the solvent from the Experimental Examples 5-1 to 5-16 contained no unreacted raw material nor intermediate compound and all the salts were fluorinated and cation-exchanged.

[Water Content]

The water content was measured using a Karl Fischer moisture measurement device "AQ-2100" manufactured by Hiranuma Sangyo Co. Ltd. Measurement samples were prepared by 10-fold diluting 0.3 g of the alkali metal salt of fluorosulfonyl imide obtained in each experimental example with methanol. A series of operations such as preparation and measurement of a sample were performed in a dry room (temperature: 25° C., dew point: −70° C. to −50° C.). The amount of the sample injected was from 0.1 mL to 3 mL depending on the water content of the sample. "HYDRANAL (registered trademark) COULOMAT AK" (manufactured by Sigma Aldrich) was used as an anolyte (generating solution), and "HYDRANAL (registered trademark) COULOMAT CG-K" (manufactured by Sigma Aldrich) was used as a catholyte (counter electrolyte). The sample was injected through a sample inlet using a syringe so as not to contact with outside air. The water content in methanol used for dilution was measured in the same manner, and the water content in the alkali metal salt of fluorosulfonyl imide was determined by subtracting the water content in methanol from the water content (measured value) in the sample solution.

TABLE 3

| Experimental Example | Impurity content (ppm) | | | | | | | Yield (%) | Purity (%) |
|---|---|---|---|---|---|---|---|---|---|
| | $Na^+$ | $K^+$ | $Zn^{2+}$ | $F^-$ | $Cl^-$ | $SO_4^{2-}$ | Water | | |
| 5-1 | 3 | ND | ND | 94 | ND | 567 | 88 | 49 | 100 |
| 5-2 | 4 | ND | ND | 108 | ND | 723 | 124 | 56 | 100 |
| 5-3 | 5 | 4 | ND | 254 | ND | 1827 | 108 | — | 100 |
| 5-4 | 7 | 5 | 3 | 343 | 45 | 2462 | 132 | — | 100 |
| 5-5 | 39 | 8 | ND | 551 | 9 | 13 | 323 | — | 100 |
| 5-6 | 36 | 7 | ND | 500 | 13 | 17 | 279 | — | 100 |
| 5-7 | 26 | ND | ND | 376 | 11 | 837 | 64 | 51 | 100 |
| 5-8 | 27 | ND | ND | 154 | 16 | 399 | 150 | 54 | 100 |
| 5-9 | 13 | 11 | ND | 16 | 32 | 198 | 64 | 56 | 100 |
| 5-10 | 15 | 12 | ND | 773 | ND | 612 | 128 | 56 | 100 |
| 5-11 | 42 | 12 | 4 | 150 | 5 | 156 | 70 | 59 | 100 |
| 5-12 | 11 | ND | 5 | 50 | 5 | 198 | 69 | 54 | 100 |
| 5-13 | 24 | ND | ND | 293 | 4 | 208 | 58 | 62 | 100 |
| 5-14 | ND | 29 | ND | 357 | 5 | 342 | 105 | 64 | 100 |
| 5-15 | 30 | ND | ND | 148 | 4 | 181 | 73 | — | 100 |
| 5-16 | 22 | ND | 5 | 105 | 8 | 352 | 115 | — | 100 |
| 2-1 | 8 | 3 | 3 | 13 | 3 | 147 | 68 | 56 | 100 |
| 3 | 14 | 16 | 1 | 1222 | 10 | 3393 | 68 | — | 100 |

In Table 3, the "yield" means a yield from the concentration step. The yield was not calculated in Experimental Examples 5-3 to 5-6, 5-15 to 5-16 and Experimental Example 3. Also, the "purity 100%" means that peaks other than the peaks originating from fluorosulfonyl imide and an internal standard substance were not confirmed on a chart obtained by $^{19}$F-NMR measurement (solvent: deuterated acetonitrile).

From Table 3, the amounts of various impurities in the lithium bis(fluorosulfonyl)imide were reduced in Experimental Examples 5-1 to 5-16 adopting the concentration step by the thin film distillation, as compared with the lithium bis(fluorosulfonyl)imide of Experimental Example 3 which was concentrated and dried in the shelf-type vacuum dryer. It is apparent from the results that, according to the method of the present invention, the production of impurities can be suppressed and an alkali metal salt of fluorosulfonyl imide having a low content of various impurities can be obtained.

In Experimental Example 5, the amounts of impurity ions were small in all experimental examples but some variations in their contents were observed between the experimental examples. It is considered that fluorosulfonyl imide is easily influenced by heat, and therefore, some variations in the amounts of impurities produced were observed even when the same operations were performed.

Experimental Example 6

The amount of the residual solvent contained in the alkali metal salts of fluorosulfonyl imide obtained in Experimental Examples 2-1, 3 and 5 was measured by the following method.

[Amount of Residual Solvent]

To 0.05 g of the alkali metal salt of fluorosulfonyl imide obtained in the above experimental examples, 200 μl of an aqueous solution of dimethyl sulfoxide (dimethyl sulfoxide/ultrapure water=20/80, volume ratio) and 2 ml of an aqueous solution of 20% by mass sodium chloride were added to prepare a measurement solution. The solution was charged into a vial container and the vial container was sealed. The amount of the residual solvent contained in the alkali metal salt of fluorosulfonyl imide was then measured by a head space-gas chromatography system ("Agilent 6890" manufactured by Agilent).

Device: Agilent 6890;
Column: HP-5 (length: 30 m, inner diameter of column: 0.32 mm, membrane thickness: 0.25 μm) (manufactured by Agilent);
Temperature condition of column: 60° C. (retention: 2 minutes), temperature increase at 30° C./minute up to 300° C., 300° C. (retention: 2 minutes);
Head space condition: 80° C. (retention: 30 minutes);
Injector temperature: 250° C.;
Detector: FID (300° C.).

The results are shown in Table 4. The amounts of the residual solvents in Experimental Example 2-1 and Experimental Example 3 are also shown in Table 4.

TABLE 4

| Experimental Example | Residual solvent (ppm) | |
|---|---|---|
| | Toluene | Butyl acetate |
| 5-4 | 32 | 3734 |
| 5-5 | 70 | 603 |
| 5-6 | 403 | 863 |
| 5-8 | 86 | 1134 |
| 5-9 | 746 | 3282 |
| 5-10 | 230 | 3179 |
| 5-11 | 33 | 2767 |
| 5-12 | 29 | 1029 |
| 5-13 | 664 | 2986 |
| 5-14 | 40 | 1782 |
| 5-15 | 243 | 3778 |
| 5-16 | 81 | 3369 |
| 2-1 | 38 | 3463 |
| 3 | 0 | 1879 |

As is apparent from Table 4, according to the method of the present invention, the amount of the residual solvent can be reduced to a level similar to that in Experimental Example 3 using the shelf-type vacuum dryer while suppressing the production of impurities.

Experimental Example 7

According to a method similar to that in Experimental Example 4, the heat resistance (mass loss, 2% mass loss temperature) of the alkali metal salt of fluorosulfonyl imide obtained in Experimental Example 5 was measured. The results are shown in Table 5. For comparison, the amounts of impurities in each experimental example as well as the results of Experimental Example 2-1 and Experimental Example 3 are also shown in Table 5.

TABLE 5

| Experimental Example | Heat Resistance 1 (%) Mass loss rate | Heat Resistance 2 (°C.) 1% Mass loss | 2% Mass loss | Impurity content (ppm) Na+ | K+ | Zn²⁺ | F⁻ | Cl⁻ | SO₄²⁻ | Water |
|---|---|---|---|---|---|---|---|---|---|---|
| 5-3 | 0 | 180 | 215 | 5 | 4 | ND | 254 | ND | 1827 | 108 |
| 5-5 | 0 | 198 | 222 | 39 | 8 | ND | 551 | 9 | 13 | 323 |
| 5-13 | 0 | 201 | 229 | 24 | ND | ND | 293 | 4 | 208 | 58 |
| 2-1 | 0 | 209 | 235 | 8 | 3 | 3 | 13 | 3 | 147 | 68 |
| 3 | 3 | 170 | 207 | 14 | 16 | 1 | 1222 | 10 | 3393 | 68 |

Even in Experimental Examples 5-3, 5-5 and 5-13 adopting the concentration step by the thin film distillation method, the production of impurities was suppressed, and the lithium bis(fluorosulfonyl)imide in each of these experimental examples showed favorable heat resistance.

Experimental Example 8

Then, 1 g of the lithium bis(fluorosulfonyl)imide obtained in Experimental Example 2-1 was dissolved in 9 g of a mixed solution of ethylene carbonate/ethylmethyl carbonate (50/50, volume ratio) to prepare an electrolytic solution 1. Similarly, an electrolytic solution 2 was prepared using the lithium bis(fluorosulfonyl)imide obtained in Experimental Example 3.

Each of the electrolytic solutions 1 and 2 was charged into a 20 ml brown screw tube, and the tube was sealed to prevent invasion of water from the outside. The screw tube charged with each electrolytic solution was stored at a temperature of 25° C. for 2 months, and a temporal change of the electrolytic solutions 1 and 2 was evaluated.

The change of appearance was not observed in the electrolytic solution 1 prepared using the product of Experimental Example 2-1 as a raw material, and the electrolytic solution 1 was a clear, colorless liquid. However, yellow-orange coloration was observed in the electrolytic solution 2 prepared using the product of Experimental Example 3 as a raw material. In a measurement solution prepared by diluting the electrolytic solutions 1 and 2 before and after storage with ultrapure water, the content of impurities was measured by ion chromatography according to the above mentioned method for measuring the content of impurities. The results are shown in Table 6.

TABLE 6

| | Before storage | | 2 months later | |
|---|---|---|---|---|
| | F⁻ | SO₄²⁻ | F⁻ | SO₄²⁻ |
| Electrolytic solution 1 | 1 | 14 | 2 | 14 |
| Electrolytic solution 2 | 122 | 339 | 153 | 413 |

As shown in Table 6, in the electrolytic solution 1 obtained from Experimental Example 2-1, the amount of the fluoride ions was 2 ppm (before storage: 1 ppm) and the amount of the sulfate ions was 14 ppm (before storage: 14 ppm), these amounts were almost identical with those before storage. On the other hand, in the electrolytic solution 2 obtained from Experimental Example 3, the amount of the fluoride ions was 153 ppm (before storage: 122 ppm) and the amount of the sulfate ions was 413 ppm (before storage: 339 ppm), and it was confirmed that the impurities increased as compared with those before storage. It was apparent from the results that the electrolytic solution of the present invention was excellent in storage stability.

INDUSTRIAL APPLICABILITY

According to the present invention, a solvent can be removed rapidly from a reaction solution and an alkali metal salt of fluorosulfonyl imide can be produced efficiently, even when the production scale is increased. Also, in the method of the present invention, there is no need to heat at high temperature, and therefore, a reduction in yield due to thermal decomposition of an alkali metal salt of fluorosulfonyl imide can be suppressed, and consequently, a reduction in heat resistance of an alkali metal salt of fluorosulfonyl imide can be suppressed. Furthermore, the alkali metal salt of fluorosulfonyl imide of the present invention has a reduced amount of various impurities, and therefore, is useful as an ionic conductor and the like for various electrochemical devices. In addition, the production method of the present invention is suitable as an industrial production method of an alkali metal salt of fluorosulfonyl imide.

The invention claimed is:

1. A composition comprising an alkali metal salt of fluorosulfonyl imide represented by the following formula (I), having a content of sulfate ions ($SO_4^{2-}$) of 3,000 ppm or less,

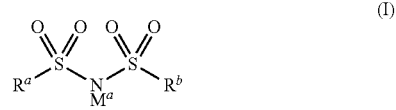

(I)

wherein in the formula (I), $M^a$ represents an alkali metal, and $R^a$ and $R^b$ are the same or different and represent a fluorine atom, or a alkyl group having 1 to 6 carbon atoms in which one or more hydrogen atoms are substituted with a fluorine atom, and at least one of $R^a$ or $R^b$ is a fluorine atom.

2. The composition comprising the alkali metal salt of fluorosulfonyl imide according to claim 1, wherein a content of fluoride ions (F⁻) is 1,000 ppm or less.

3. The composition comprising the alkali metal salt of fluorosulfonyl imide according to claim 2, wherein a water content is 500 ppm or less.

4. The composition comprising the alkali metal salt of fluorosulfonyl imide according to claim 3, further comprising 4,000 ppm or less of a residual solvent.

5. The composition comprising the alkali metal salt of fluorosulfonyl imide according to claim 1, wherein the alkali metal salt of fluorosulfonyl imide is an alkali metal salt of bis(fluorosulfonyl)imide.

6. The composition comprising the alkali metal salt of fluorosulfonyl imide according to claim 1, wherein the alkali metal salt of fluorosulfonyl imide is selected from a sodium salt, a potassium salt or a lithium salt.

7. The composition comprising the alkali metal salt of fluorosulfonyl imide according to claim 3, wherein the alkali metal salt of fluorosulfonyl imide is an alkali metal salt of bis(fluorosulfonyl)imide.

8. The composition comprising the alkali metal salt of fluorosulfonyl imide according to claim 4, wherein the alkali metal salt of fluorosulfonyl imide is an alkali metal salt of bis(fluorosulfonyl)imide.

9. The composition comprising the alkali metal salt of fluorosulfonyl imide according to claim 3, wherein the alkali metal salt of fluorosulfonyl imide is selected from a sodium salt, a potassium salt or a lithium salt.

10. The composition comprising the alkali metal salt of fluorosulfonyl imide according to claim 4, wherein the alkali metal salt of fluorosulfonyl imide is selected from a sodium salt, a potassium salt or a lithium salt.

11. A method for producing an alkali metal salt of fluorosulfonyl imide described in claim 1, comprising a step of concentrating a solution of an alkali metal salt of fluorosulfonyl imide while bubbling a gas into a reaction solution containing the alkali metal salt of fluorosulfonyl imide, and/or, concentrating the solution of the alkali metal salt of fluorosulfonyl imide by thin film distillation.

12. The method for producing an alkali metal salt of fluorosulfonyl imide according to claim 11, wherein a reaction solvent contained in the reaction solution is an ester solvent and/or a nitrile solvent.

13. The method for producing an alkali metal salt of fluorosulfonyl imide according to claim 11, wherein the concentrating step is carried out by using thin film distillation.

14. The method for producing an alkali metal salt of fluorosulfonyl imide according to claim 11, further comprising a step of fluorinating chlorosulfonyl imide or a salt thereof in the presence of the reaction solvent.

15. The method for producing an alkali metal salt of fluorosulfonyl imide according to claim 12, further comprising a step of fluorinating chlorosulfonyl imide or a salt thereof in the presence of the reaction solvent.

16. The method for producing an alkali metal salt of fluorosulfonyl imide according to claim 13, further comprising a step of fluorinating chlorosulfonyl imide or a salt thereof in the presence of the reaction solvent.

* * * * *